(12) United States Patent
Ju et al.

(10) Patent No.: US 11,358,876 B2
(45) Date of Patent: Jun. 14, 2022

(54) AEROSOL-BASED HIGH-TEMPERATURE SYNTHESIS OF MATERIALS

(71) Applicant: PRINCETON UNIVERSITY, Princeton, NJ (US)

(72) Inventors: Yiguang Ju, Princeton, NJ (US); Maksym Mezhericher, Princeton, NJ (US); Christopher Abram, Princeton, NJ (US)

(73) Assignee: PRINCETON UNIVERSITY, Princeton, NJ (US)

( * ) Notice: Subject to any disclaimer, the term of this patent is extended or adjusted under 35 U.S.C. 154(b) by 244 days.

(21) Appl. No.: 16/604,623

(22) PCT Filed: Apr. 27, 2018

(86) PCT No.: PCT/US2018/029961
§ 371 (c)(1),
(2) Date: Oct. 11, 2019

(87) PCT Pub. No.: WO2018/201054
PCT Pub. Date: Nov. 1, 2018

(65) Prior Publication Data
US 2021/0114874 A1    Apr. 22, 2021

Related U.S. Application Data

(60) Provisional application No. 62/491,321, filed on Apr. 28, 2017.

(51) Int. Cl.
| | | |
|---|---|---|
| *C01F 17/00* | (2020.01) | |
| *C01F 17/218* | (2020.01) | |
| *B01J 23/83* | (2006.01) | |
| *B01J 23/00* | (2006.01) | |
| *C01F 7/16* | (2022.01) | |
| *C01B 13/34* | (2006.01) | |
| *C01G 45/12* | (2006.01) | |
| *C01G 53/00* | (2006.01) | |
| *C01F 17/34* | (2020.01) | |

(52) U.S. Cl.
CPC .......... *C01F 17/218* (2020.01); *B01J 23/002* (2013.01); *B01J 23/83* (2013.01); *C01B 13/34* (2013.01); *C01F 7/16* (2013.01); *C01F 17/34* (2020.01); *C01G 45/1242* (2013.01); *C01G 53/50* (2013.01); *C01B 2203/0238* (2013.01); *C01P 2002/70* (2013.01); *C01P 2002/72* (2013.01); *C01P 2004/03* (2013.01); *C01P 2004/04* (2013.01); *C01P 2004/34* (2013.01); *C01P 2004/51* (2013.01); *C01P 2004/53* (2013.01); *C01P 2004/61* (2013.01); *C01P 2004/62* (2013.01); *C01P 2004/64* (2013.01)

(58) Field of Classification Search
CPC . C01F 17/218; C01F 17/34; C01F 7/16; B01J 23/002; B01J 23/83; C01B 13/34; C01G 45/1242; C01G 53/50
See application file for complete search history.

(56) References Cited

U.S. PATENT DOCUMENTS

| | | |
|---|---|---|
| 5,145,113 A | 9/1992 | Burwell et al. |
| 6,565,010 B2 | 5/2003 | Anderson et al. |
| 8,728,361 B2 | 5/2014 | Cai et al. |
| 8,864,045 B1 * | 10/2014 | Jiang ................. B05B 1/24 239/13 |
| 8,888,889 B2 | 11/2014 | Glicksman et al. |
| 9,737,886 B2 | 8/2017 | Noll et al. |
| 2007/0069180 A1 | 3/2007 | Ju et al. |
| 2011/0114745 A1 | 5/2011 | Buisson et al. |
| 2014/0363365 A1 | 12/2014 | Berry et al. |
| 2016/0015652 A1 | 1/2016 | John et al. |
| 2017/0203312 A1 | 7/2017 | Mezhericher et al. |

FOREIGN PATENT DOCUMENTS

| | | |
|---|---|---|
| CN | 102309950 A | 1/2012 |
| CN | 103209759 A | 7/2013 |
| CN | 105324174 A | 2/2016 |
| WO | WO2016-055993 A1 | 4/2016 |

OTHER PUBLICATIONS

PCT International Search Report and the Written Opinion dated Jul. 26, 2018, issued in related International Application No. PCT/US2018/029961 (12 pages).
Huang et al., "Microscopically porous, interconnected single crystal $LiNi_{1/3}Co_{1/3}Mn_{1/3}O_2$ cathode material for Lithium ion batteries"; Journal of Materials Chemistry, vol. 21, Issue 29, Jun. 2011, pp. 10777-10784.
Maksim Mezhericher, et al., "Atomization of liquids by disintegrating thin liquid films using gas jets", International Journal of Muitiplase Fiow, vol. 88, 2017, pp. 99-115.
Maksim Mezhericher, et al., "Aerosol-assisted synthesis of submicron particles at room temperature using ultra-.fine liquid atomization", Chemicai Engineering Journal, vol. 346, 2018, pp. 606-620.
Xiao Qin, et al., "Flame Synthesis of $Y_2O_3$: Eu nanophosphors using ethanol as precursor solvents", J Mater. Res., vol. 20, No. 11, Nov. 2005, pp. 2960-2968.
Xiao Qin, et al. "Europium-doped yttrium silicate nanophosphors prepared by flame synthesis", Materials Research Bulletin, vol. 42, 2007, pp. 1440-1449.
Israel Patent Application No. 235083, titled "Liquid-Atomization Method and Device", filed on Oct. 7, 2014, Maksym Mezhericher, et al.
First Search dated Apr. 15, 2021, issued in related Chinese Application No. 201880026771.4 (2 pages).
First Office Action dated Apr. 26, 2021, issued in related Chinese Application No. 201880026771.4, with English machine translation (20 pages).

* cited by examiner

*Primary Examiner* — Steven J Bos

(57) ABSTRACT

A material synthesis method may comprise: adding at least one liquid precursor solution to an atomizer device; generating by the atomizer device an aerosol comprising liquid droplets; transporting the aerosol to a reactive zone for evaporating one or more solvents from the aerosol; and collecting particles synthesized from at least evaporating the aerosol.

15 Claims, 16 Drawing Sheets

300

1 – vessel, 2 – tube, 3 – air filter, 4 – air pressure regulator, 5 – opening

600

(601) adding at least one liquid precursor solution to an atomizer device (602) generating by the atomizer device an aerosol comprising liquid droplets (603) transporting the aerosol to a preheating section (604) transporting the aerosol to a reactive zone for evaporating one or more solvents from the aerosol (605) collecting synthesized particles

(701) adding a first precursor solution to an atomizer device to generate a first aerosol comprising first liquid droplets (702) transporting the first aerosol to a reactive zone for evaporating one or more first solvents from the first aerosol to obtain first synthesized particles of a first size distribution (703) adding a second precursor solution to the atomizer device to generate a second aerosol comprising second liquid droplets (704) transporting the second aerosol to the reactive zone for evaporating one or more second solvents from the second aerosol to obtain second synthesized particles of a second size distribution

FIG. 13

AEROSOL-BASED HIGH-TEMPERATURE SYNTHESIS OF MATERIALS

CROSS REFERENCE TO RELATED APPLICATIONS

The present application is a national stage application under 35 U.S.C. § 371 of International Application No. PCT/US2018/029961, titled "AEROSOL-BASED HIGH-TEMPERATURE SYNTHESIS OF MATERIALS" filed on Apr. 27, 2018, which is based on and claims priority of benefit to U.S. Provisional Application No. 62/491,321, titled "Method for high temperature synthesis of functional nanoparticles using sub-micron aerosol droplets" filed on Apr. 28, 2017. The contents of all of the above-references applications are hereby incorporated by reference in their entirety.

STATEMENT REGARDING FEDERALLY SPONSORED RESEARCH OR DEVELOPMENT

This invention was made with government support under Grant No. CMMI-1449314 awarded by the National Science Foundation. The government has certain rights in the invention.

TECHNICAL FIELD

The present invention relates to the field of material science and engineering, and in particular, to high-temperature synthesis of functional nanoparticles and thin films based on aerosol droplets.

BACKGROUND

Nanostructured materials like nanoparticles and thin films have significant impacts in energy-related and various other applications for their unique properties. Existing methods for producing materials in such applications have various disadvantages. For instance, solid state reactions can be used to produce metal oxide or lithium orthosilicate particles for thermochemical energy storage, but the particle size and shape are difficult to control and subsequent milling/washing steps are required. Wet chemical (co-precipitation) methods can be used to produce battery cathode materials but the processing time is very long (24 hours) and large volumes of toxic waste are produced. Usually the size distribution of the synthesized particles is broad, so separation/sieving (such as by air jet siever) is required, which reduces the product yield. Furthermore, the particle size of particles produced under the current methods is generally several microns or more, which is unlikely to meet the requirement for smaller particles in battery electrode and catalytic applications greatly. Lastly, some aerosol techniques such as spray drying or spray flames use either highly dilute precursor solutions or expensive organometallic precursors to achieve particle size control, which poses as a significant hurdle for mass production. Other conventional atomization technologies require high atomization energy and have poor prospects for industrial scale-up due to their high production costs.

SUMMARY

Systems and methods for synthesizing various materials (e.g., electrochemically, thermochemically, or opto-electronically active materials) are disclosed. Such materials can be used for energy conversion and storage.

According to one aspect of the present disclosure, a material synthesis method may comprise: adding at least one liquid precursor solution to an atomizer device; generating by the atomizer device an aerosol comprising liquid droplets; transporting the aerosol to a reactive zone for evaporating one or more solvents from the aerosol; and collecting synthesized particles.

According to another aspect, a material synthesis system may comprise: an atomizer device for receiving at least one liquid precursor solution to generate an aerosol comprising liquid droplets; an atomizer channel; and a reactor. The atomizer channel is connected to the atomizer device at a first end and to the reactor at a second end. The atomizer channel is at least for transporting the aerosol to the reactor. The reactor comprises a reactive zone for evaporating one or more solvents from the aerosol to obtain synthesized particles.

According to another aspect of the present disclosure, a material synthesis method may comprise adding a first precursor solution to an atomizer device to generate a first aerosol comprising first liquid droplets, transporting the first aerosol to a reactive zone for evaporating one or more first solvents from the first aerosol to obtain first synthesized particles of a first size distribution, adding a second precursor solution to the atomizer device to generate a second aerosol comprising second liquid droplets, and transporting the second aerosol to the reactive zone for evaporating one or more second solvents from the second aerosol to obtain second synthesized particles of a second size distribution.

These and other features of the systems and methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 12 is a flowchart illustrating an exemplary material synthesis method, consistent with various embodiments of the present disclosure.

FIG. 13 is a flowchart illustrating an exemplary material synthesis method, consistent with various embodiments of the present disclosure.

DETAILED DESCRIPTION

Figure 1:
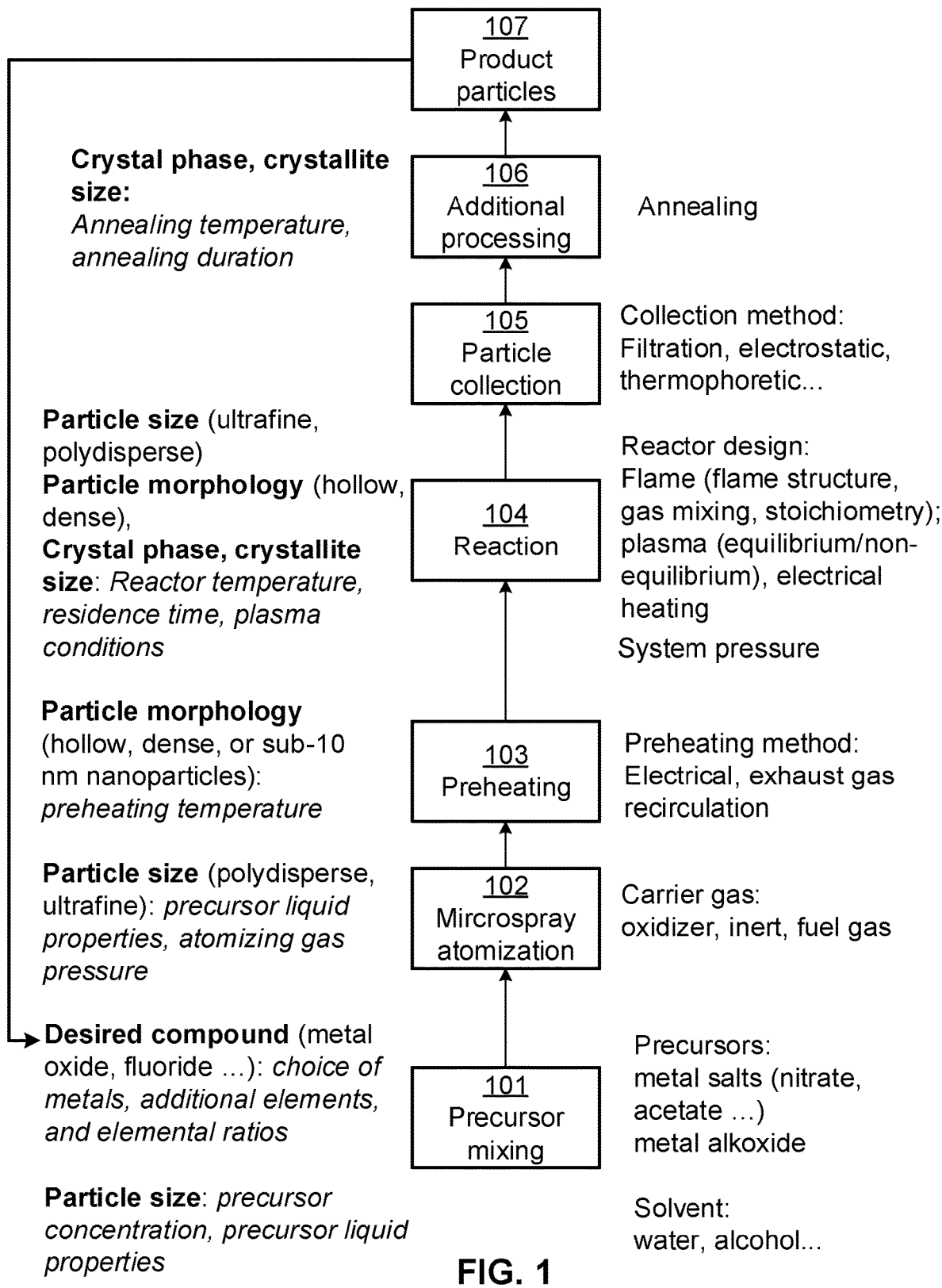
FIG. 1 is a flowchart illustrating an exemplary material synthesis method, consistent with various embodiments of the present disclosure.

As described in the background, current methods for synthesizing small structures (e.g., nanoparticles, microparticles, thin films) are inadequate to meet the application requirements. To mitigate or overcome such disadvantages in existing technologies, various material synthesis systems and methods are disclosed.

In various embodiments, a continuous high-temperature synthesis method is disclosed. This method can be used for the production of size and morphology controlled nanomaterials. The method implements both aerosol droplets produced by an atomizer device and morphology control steps to produce a scalable hierarchy of nanostructured materials. For example, monodispersed or near-monodisperse ultrafine (a narrow distribution in the 5-100 nm size range, e.g., 5-10 nm, 50-60 nm, 5-20 nm, 10-30 nm, 30-50 nm, 60-80 nm, 80-100 nm) nanoparticles, polydisperse and non-aggregated particles (a broad distribution in the 5 nm-10 µm size range, e.g., 5-10 nm nanoparticles and 1-10 µm particles, or a continuous distribution in the 100 nm-10 µm size range, or combinations thereof), and hollow-structured particles can be synthesized through the control of aerosol droplet size, preheating, and synthesis temperature. Using economically viable precursors, the produced material can have a targeted crystalline phase and element composition. Metal oxide, sulphide, nitride, chloride, fluoride, and carbonate nanoparticles as well as thin films (e.g., 5 nm-100 µm thick) can be produced based on the disclosed methods.

In some exemplary applications, cathode, electrolyte, and anode nanomaterials for electrochemical energy storage may be synthesized and used in lithium-ion batteries, sodium batteries, and solid state batteries. Other applications for the produced materials may include metal catalysts for chemical conversion of fuels, photo-active materials for optoelectronic applications (e.g., solar cells), imaging materials (e.g., scintillators, remote sensors), thermal chemical materials used in thermochemical energy storage for solar thermal power generation, thermal power plants, electrolyte materials for solid-oxide fuel cells, and functionalized surface coatings (e.g., thin films). Other applications may include materials of cosmetics, paints, inks, and nanocomposites (e.g., thin multilayer films), ultra-hard materials, communication materials (e.g., optical fiber materials, rare-earth doped materials), displays and lighting, lasers, security and labelling, counterfeiting, medical diagnosis and treatment materials (e.g., photodynamic materials, pharmaceuticals), and remote optical sensor materials.

In some embodiments, various features are disclosed for achieving synthesis product particle size and morphology control: (i) control of the droplet size distribution, where an atomizer device operates in a sub-micron mode, and the majority of droplets by number are 100-1000 nm in diameter, or the atomizer device operates in a dual mode, and the aerosol comprises both sub-micron droplets and larger droplets in the size range 1-100 µm, allowing synthesis of monodispersed ultrafine (e.g., 5-100 nm) or polydisperse (e.g., 5 nm-10 µm) nanomaterials respectively; (ii) a preheating section to control the particle size and morphology, respectively, for the production of monodispersed ultrafine particles (e.g., 5-100 nm) via a gas-to-particle synthesis process, or hollow-structured particles via a shell formation process; (iii) the synthesis temperature can be varied to produce either monodispersed ultrafine nanoparticles (e.g., 5-100 nm) or larger polydisperse particles (e.g., 5 nm-10 µm). Furthermore, regarding the material nanostructure, (iv) the applications of the atomizer device as well as the preheating and synthesis temperature control in this process can enable formation of polydisperse (e.g., 5 nm-10 µm) and monodisperse ultrafine nanoparticles (e.g., 5-100 nm); and (v) hollow-structured particles can be formed using the appropriate combination of preheating and synthesis temperature.

FIG. 1 is a flowchart illustrating an exemplary material synthesis method, consistent with various embodiments of the present disclosure. The disclosed exemplary material synthesis method may comprise continuous high-temperature synthesis steps for producing size and morphology controlled materials. The produced materials (e.g., nanomaterials) may be used for energy conversion, energy storage, imaging, catalysts, and functionalized surface coatings (thin films). As shown in FIG. 1, the exemplary material synthesis method may comprise steps 101-107. In FIG. 1, exemplary product particle properties controlled at each step are provided to the left of the each step, and exemplary additional process variables are provided to the right of the each step. The operations of the exemplary material synthesis method and its various steps presented herein are intended to be illustrative. Depending on the implementation, the exemplary material synthesis method may include additional, fewer, or alternative steps performed in various orders or in parallel.

Referring to FIG. 1, in some embodiments, the material synthesis method comprises: (step 101) preparing liquid precursor solutions containing desired metal elements and mixing the precursor solutions; (step 102) generating an aerosol using an atomizer device; (step 103) in a continuous process, preheating the aerosol (e.g., in a preheating section between 50-500° C., such as, 50-200° C., 100-200° C., 200-300° C., 300-400° C., 400-500° C., etc.) for 0.1-10 seconds (e.g., 0.5-5 seconds, 5-10 seconds, etc.), which allows control of the particle morphology such as formation of hollow-structured particles); (step 104) transporting the aerosol into a high-temperature reactive zone (e.g., the reactive zone may be at 500-10000° C., such as, 500-1300° C. for electrical heating, 800-3000° C. for flame heating, 1000-10000° C. for plasma heating, 3000-5000° C., 5000-10000° C., etc.) and 500 mbar-10 bar pressure (e.g., atmospheric pressure or a pressure of 1-5 bar, 5-10 bar, etc.) in which the aerosol may stay for a period of time (e.g., 0.1-10 seconds), the reactive zone facilitates the production of metal oxide, sulphide, nitride, chloride, fluoride, carbonate, and other materials), and the temperature may be controlled to produce ultrafine nanoparticles (e.g., 5-100 nm size) or larger particles (e.g., 5 nm-10 μm size); and (step 105) collecting the product particles (e.g., from an exhaust stream, depositing the product particles directly on a substrate to generate thin films). Optionally, at (step 106), additional processing (e.g., annealing) may be implemented to improve the particle crystalline structure. The synthesized material can be obtained at (step 107).

Figure 2:
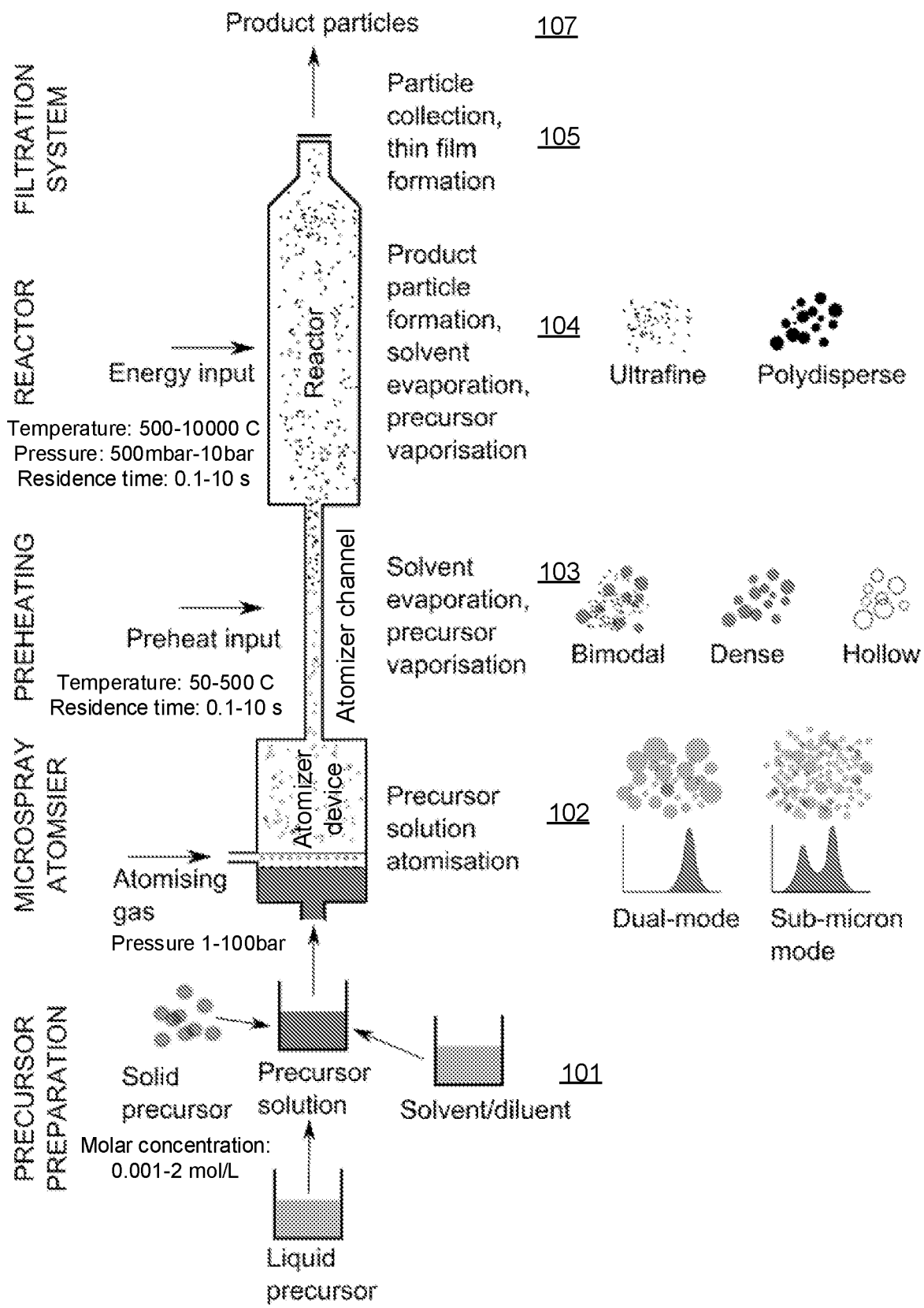
FIG. 2 is a graphical illustration of the exemplary material synthesis method, consistent with various embodiments of the present disclosure.

FIG. 1 can be related to FIG. 2, which provides graphical illustrations of the exemplary material synthesis method, consistent with various embodiments of the present disclosure. FIG. 2 shows a general schematic diagram of the synthesis method. From left to right, FIG. 2 illustrates main components of the apparatus for synthesis, description of governing processes, and the aerosol droplet modes, preheating control, and product particle size distributions at certain steps. Referring to FIG. 2, a material synthesis system may comprise: an atomizer device for receiving at least one liquid precursor solution to generate an aerosol comprising liquid droplets; an atomizer channel; and a reactor. When the atomizer device is implemented as a microspray atomizer, to generate the aerosol, the atomizer device may be configured to receive the at least one liquid precursor solution and an atomizing gas flow. The atomizer device receives the atomizing gas, which may flow from a submerged portion of the liquid precursor solution. The atomizing gas may comprise at least one of an oxidizer gas, an inert gas, or a fuel gas. The atomizing gas flow may have a pressure of 1-100 bar (e.g., 1-10 bar, 10-50 bar, 50-100 bar, etc.). The atomizer channel (e.g., tube, pipe, or an alternative structure) is connected to the atomizer device at a first end and to the reactor at a second end. The atomizer channel is at least for transporting the aerosol from the atomizer device to the reactor. The atomizer channel may comprise an optional preheating section for preheating the aerosol at a temperature between 50° C. and 500° C. for 0.1-10 seconds. For example, when no heating is provided to the aerosol between the atomizing device and the reactor, the synthesized particles may be hollow-structured. The reactor comprises a reactive zone for evaporating one or more solvents from the aerosol at a temperature of 500-10000° C. and a pressure of 500 mbar-10 bar for 0.1-10 seconds to obtain synthesized particles. the reactive zone may comprise at least one of a flame, plasma, furnace, laser heating, or electric heating; Each step is described in more details below. Further details of the material synthesis steps can be referred to in both FIG. 1 and FIG. 2.

(Step 101) precursor solution preparation and mixing. In some embodiments, the metal precursors for the product particles (e.g., oxides, silicates, oxysulphides, sulphides, fluorides, nitrides) are initially in the liquid phase or prepared accordingly. Depending on the material to be formed, salts of the metals that shall form the product particles are chosen. For example, precursor solutions used for the material synthesis method may comprise metal salt(s) (e.g., nitrate, acetate, carbonate, chloride, sulphide, hydroxide) dissolved in a solvent liquid. The metal in the metal salt(s) may comprise any alkaline, transition, or lanthanide (rare-earth) metal(s) or metalloids. For example, these metal salts may comprise nitrates $(M(NO_3)_x \cdot yH_2O)$, chlorides $(MCl_x)$, acetates $M(O_2C_2H_3)_x \cdot yH_2O)$, etc.

In some embodiments, to prepare the precursor solutions, the metal salts are weighed to the correct atomic stoichiometry as desired in the product particles. The salts (solute) are then dissolved in a liquid (solvent). The solvent liquid may comprise water, that is, the solvent does not need to be a fuel that participates in the chemical reaction by releasing heat. In other realizations of the material synthesis method the solvent may be a source of additional heat generation. For example, the solvent may comprise ethanol, butanol, isopropanol, ethylene glycol, acetic acid, or other liquid hydrocarbon fuel and combinations of these. Alternatively, the precursor solution may comprise a metal alkoxide (e.g., titanium isopropoxide, tetraethyl orthosilicate) and may be diluted with ethanol. Where the material to be synthesized is a fluoride, ammonium fluoride may be used as a precursor. Where the material to be synthesized is a sulphide or oxysulphide, sulphur chloride may be used as a precursor.

The elemental ratio of the metals in the precursor solution controls the composition of the product particles. In some embodiments, the molar concentration of the precursor liquid may be between 0.001-2 mol/L (e.g., in the range of 0.1-2 mol/L, 0.001-1 mol/L, 0.1-1 mol/L, 1-2 mol/L, etc.), allowing additional control of the product particle size. In the droplet to particle formation mode described below, higher precursor concentrations will result in larger particles being produced.

(Step 102) aerosol generation by atomization. In some embodiments, the prepared precursor solution is atomized, for example, in an atomizer device. For example, the liquid precursor solution is contained in a chamber of the atomizer device (e.g., microspray atomizer, ultrasonic nebulizer for producing micron-sized droplets, pressure nozzle such as a diesel injector, etc.). For the descriptions below including FIG. 3A and FIG. 3B, the atomizer device is implemented as a microspray atomizer. A regulated atomizing gas flow (e.g., air, nitrogen, argon, or any tailored fuel or oxidizer mixture) is introduced into the atomizer device. The choice of atomizing gas may depend on the downstream high-temperature process of the material synthesis method. The pressure of the atomizing gas may be between 1-100 bar. The atomizing gas may comprise at least one of an oxidizer gas (oxygen or any oxygen-containing mixture, such as air), an inert gas (e.g., argon, nitrogen), or a fuel gas (e.g., hydrogen, or one or more carbon-containing gases such as methane, ethylene, propane, and other alkanes and oxygenated fuels like alcohols and ethers).

Figure 3A:
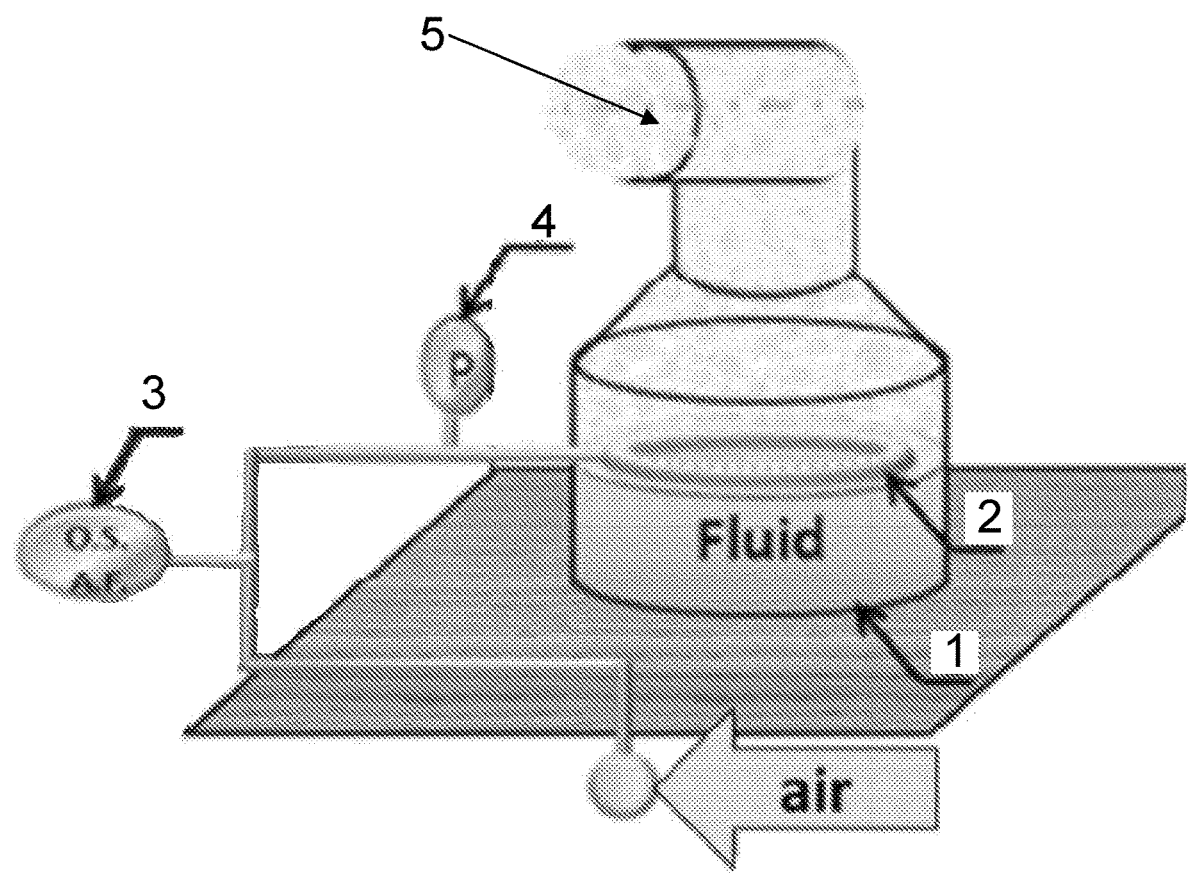
FIG. 3A is graphical illustration of an atomizer device, consistent with various embodiments of the present disclosure.
Figure 3B:
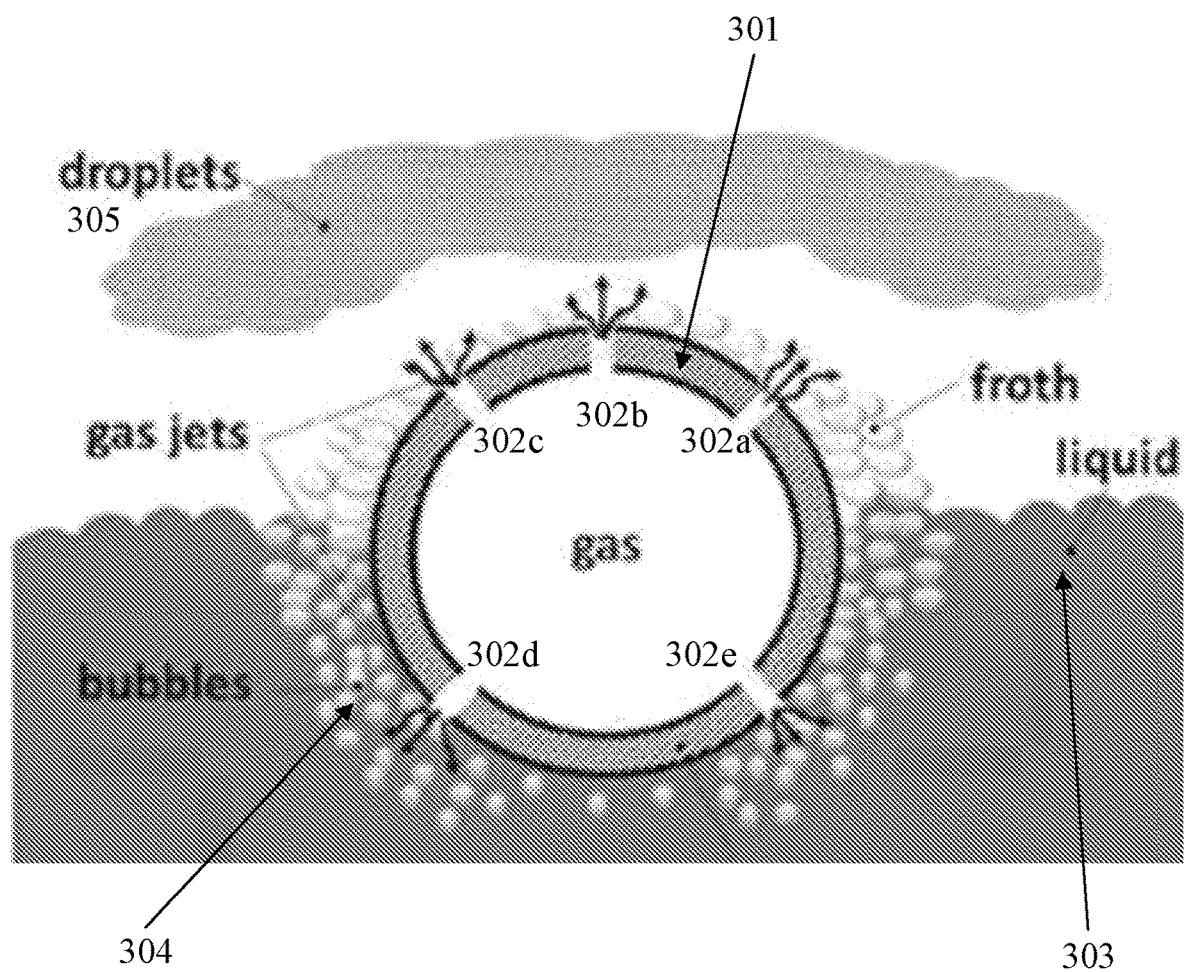
FIG. 3B is graphical illustration of aerosol generation using the atomizer, consistent with various embodiments of the present disclosure.
Figure 4A:
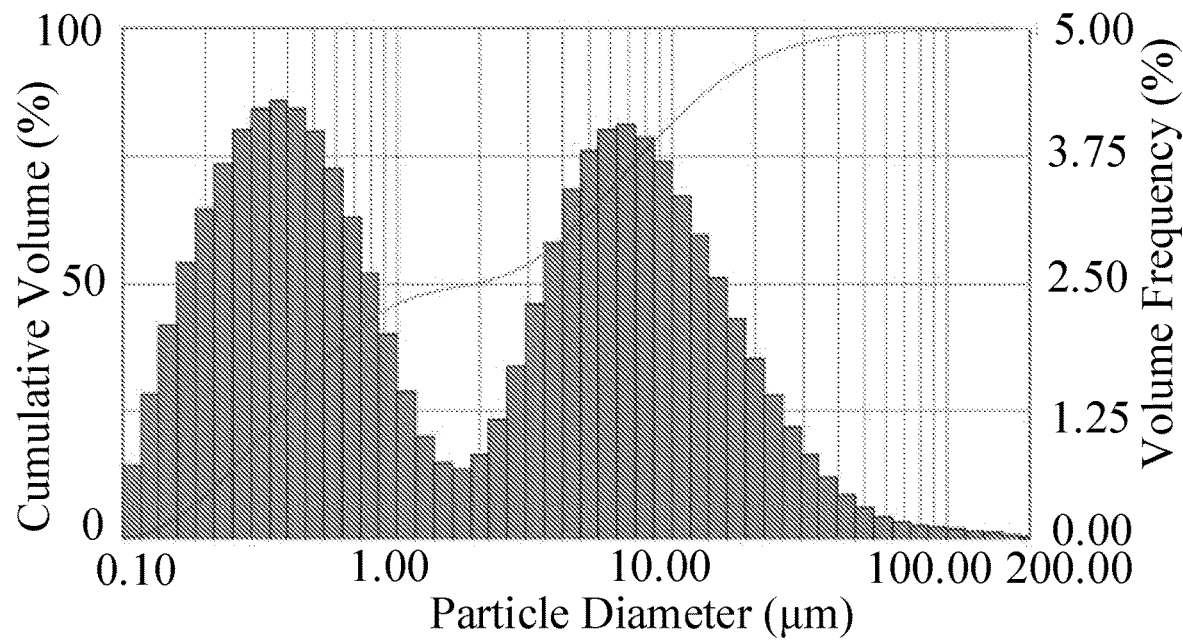
FIG. 4A and FIG. 4B are respectively graphical illustrations of volume-based and number-based droplet size distribution for a hydrocarbon-liquid-fuel-based precursor solution in the sub-micron mode, consistent with various embodiments of the present disclosure.
Figure 4B:
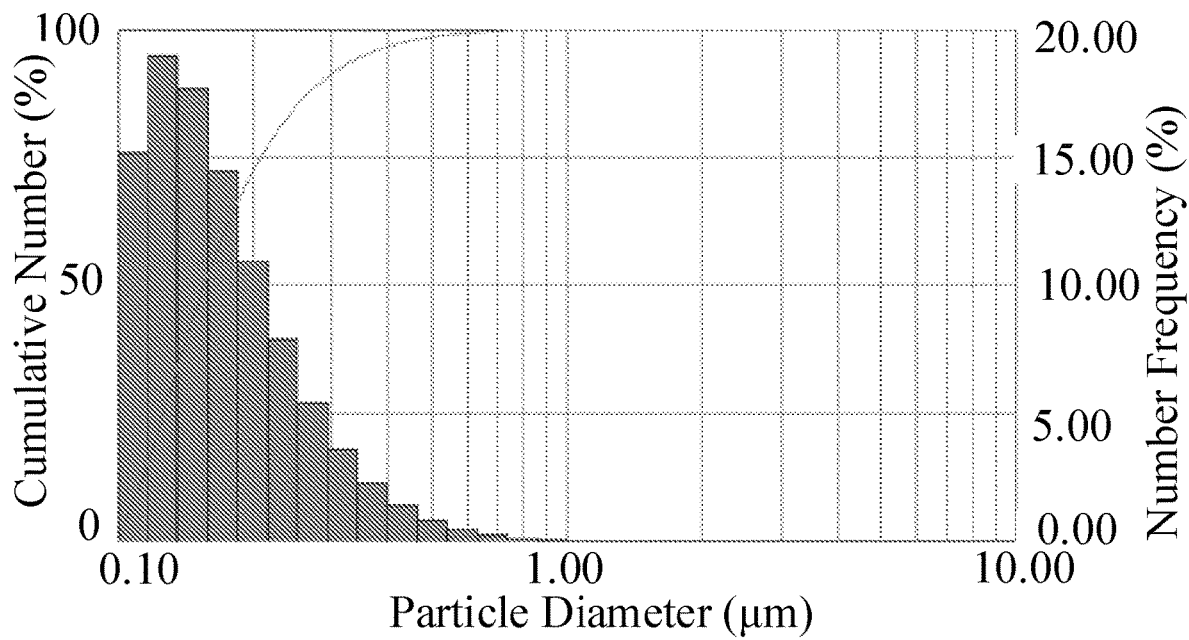
Figure 4C:
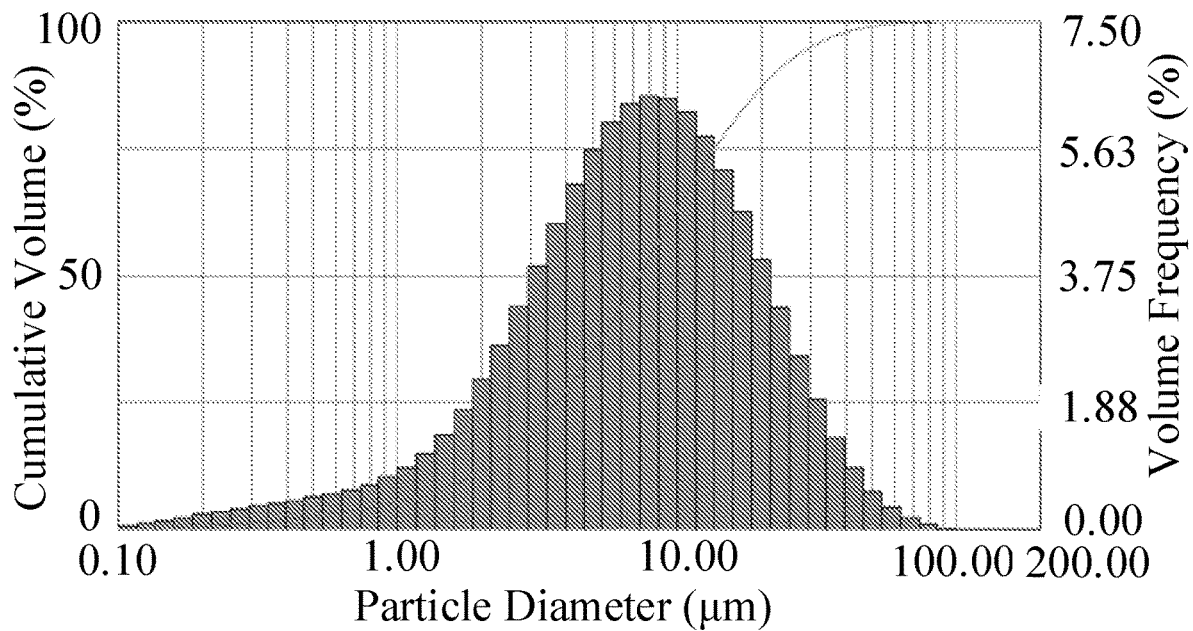
FIG. 4C and FIG. 4D are respectively graphical illustrations of volume-based and number-based droplet size distribution for a water-based precursor solution for the dual-mode, consistent with various embodiments of the present disclosure.
Figure 4D:
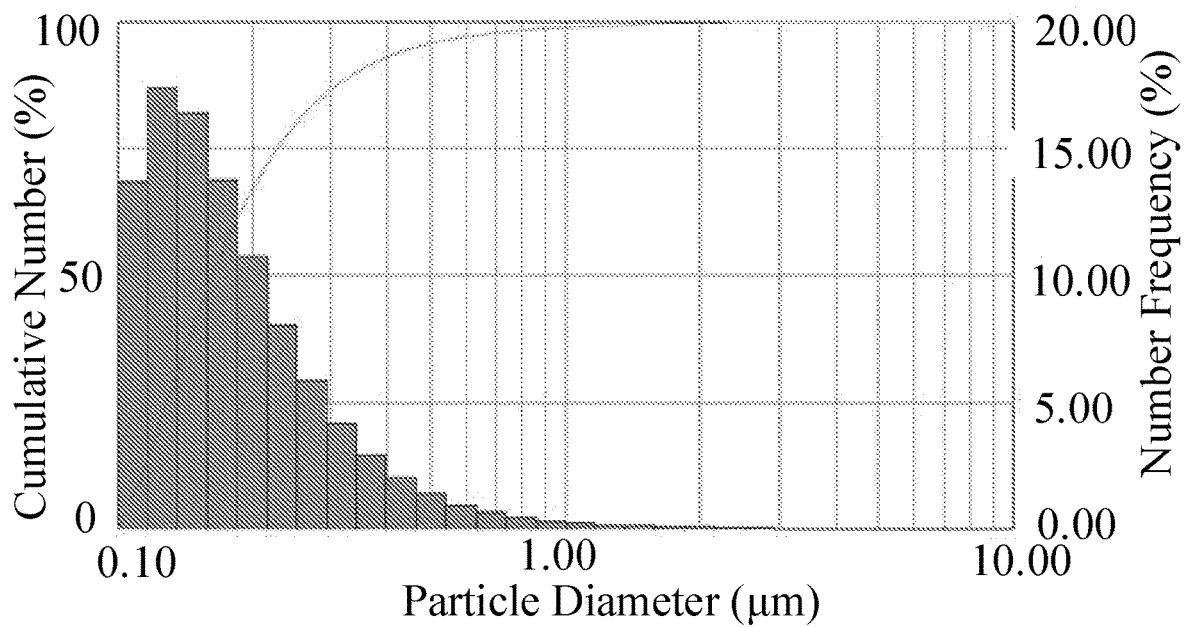

FIG. 3A is graphical illustration of an atomizer device 300, consistent with various embodiments of the present disclosure. The components of the exemplary atomizer device 300 presented herein are intended to be illustrative. Depending on the implementation, the atomizer device 300 may include additional, fewer, or alternative components.

In some embodiments, the atomizer device 300 may comprise a vessel 1, a tube 2, an optional air filter 3, and an air pressure regulator 4. When incorporated in the material synthesis system of FIG. 2, the opening 5 directly connects to the atomizer channel as shown in FIG. 2. The opening 5 may have any shape or type of connection without limitation by the illustration. The atomizer device 300 may comprise another opening for receiving the precursor solution labeled as "fluid" in FIG. 3A. The "air" shown in FIG. 3A may correspond to the atomizing gas described herein.

In some embodiments, in the vessel 1, the tube 2 (e.g., norprene tubing in a circular or other configurations), is placed to the liquid. The tube may be floating on the liquid surface and connected to the pressurized air provided with the filter 3 and the pressure regulator 4. The air flow rate may be between 1-10000 l/min or higher, or in the range 1-10 l/min, 10-100 l/min, etc. The tube 2 may be perforated with a needle having a diameter of about 0.6 mm (or alternatively at another suitable value), and approximately the same number of orifices are above and below the liquid surface (liquid/air interface). The number of orifices may be between 10 and 32 per cm, the tube may be between 1.5 and 30 cm, and the tube outer diameter may be 11 or 12 mm and inner diameter between 6 and 8.4 mm. The droplets formed in the vessel 1 rise to an exit at the opening 5. The aerosol formation can be affected by the process parameters. For example, higher diameter of the perforation needle provides larger droplets. Similarly, the thinner is film which covers the emerged orifices, the smaller are the formed droplets; the greater is the air pressure, the smaller are the droplets.

In some embodiments, inside the atomizer, compressed air may be released through a submerged lower part of a container containing the solution, forming ensembles of small bubbles. The bubbles come to the surface of the precursor liquid, forming created ensembles of thin spherical liquid films (e.g., with an estimated thickness of less than 500 nm). Simultaneously, high velocity gas jets cause the disintegration of the liquid films, forming an aerosol, which comprises precursor solution droplets suspended in the atomizing gas flow. Further details are described below with reference to FIG. 3B.

FIG. 3B is graphical illustration of aerosol generation using the atomizer, consistent with various embodiments of the present disclosure. FIG. 3B shows a cross-sectional view of the tube 2 described with reference to FIG. 3A, and the tube 2 is provided with orifices 302 (e.g., orifices 302*a*-302*e*) perforated in the walls 301 of the tube 2. The bottom portion of tube 2 is immersed in a liquid 303, and the upper portion of tube 301 is exposed to the environment. The material from which the tube 2 is produced can be of any kind that is suitable to be immersed in the liquid and can have some degree of elasticity.

In some embodiments, compressed gas (e.g., the atomizing gas described herein) is inserted into tube 301. When the compressed gas is in contact with orifices 302, the pressure difference between the compressed gas and the outer environment tend to equalize, and the compressed gas is discharged through orifices 302 by a velocity increasing with said pressure difference. The material of tube 2 (hollow body) can possess some degree of elasticity to intensify and regulate the compressed gas discharge through the orifices, to prevent liquid backflow through the orifices and also to avert clogging of the orifices when atomizing suspensions and liquids of high viscosity. For tube 2 made of elastic material, such as norprene rubber, the size of orifices perforated in the tube walls and the gas flow rate depend on the pressure of the supplied compressed gas: the higher the gas pressure, the greater will be the size of the orifices and vice versa. Moreover, because of the pressure difference between the inner and outer sides of the tube 2, the internal parts of elastic orifices 302 that are in contact with the compressed gas may have larger sizes than their outer parts that are in contact either with liquid 303 or with the environment. Therefore, the elastic orifices may have shapes close to truncated cones (e.g., with a broad end facing the inside of the tube 2 and a narrow end facing the outside of the tube 2) and may act as nozzles, accelerating the flow of the discharging compressed gas and thereby intensifying the atomization process. In addition, the elasticity of tube 2 allows orifices 302 to function as check valves, preventing backflow from liquid and environment when the compressed gas is not supplied: due to elastic expansion of the tube material, orifices perforated in the tube walls by micron needle may have zero size (will be closed) if there is no excess pressure of the compressed gas inside tube 2. In case of clogging of the orifices during the operation, the elasticity of tube 2 will have advantages because it may allow enlarging the orifice sizes by supplying higher than operating pressure of the compressed gas and thus facilitating through-scavenging of the clogs.

When the compressed gas is released through the orifices 302*d* and 302*e* that are immersed in the liquid, it creates bubbles 304 that climb up and meet compressed gas released from the orifices 302*a*, 302*b*, and 302*c* that are not immersed in the liquid. The thin-walled bubbles 304 are broken by the gas jets released from orifices 302*a*, 302*b*, and 302*c* into drops of very small size droplets 305, which are pushed away from the tube, providing a spray of the atomized liquid.

There are two sets of orifices perforated in tube walls: orifices 302 *a-c* that are located at the upper portion of tube 2 and are exposed to the environment, and orifices 302 *d-e* that are located at the lower immersed portion of tube 2, exposed to the liquid material. The number of orifices in each set (lower or immersed set, and upper or emerged set) and the diameters of the orifices of each set may be adapted to discharge desired flow rates of the compressed gas through said upper and lower sets and the skilled person will easily devise orifice configurations suitable for a specific need. The tube can be straight or bent in various spatial configurations, so that said longitudinal axis may have the shape of, e.g., circle, ellipse, coil etc. Along the tube, some sections may be entirely immersed or entirely emerged, but at least some sections must be partially immersed, having the longitudinal axis located in a plane parallel or identical to the interface between the liquid and the atmosphere. Alternatively, the atomizer device can be of various other shapes and configurations, as long as it comprises a tube that contains a flow of compressed gas, is partially immersed in a liquid material, and has orifices perforated in its walls as described.

Further information of the atomizer can be found from the following publications, which are incorporated herein by reference in their entirety: (1) Mezhericher, M., Ladizhensky, I. and Etlin, I. Atomization of liquids by disintegrating thin liquid films using gas jets. International Journal of Multiphase Flow 2017, 88: 99-115; (2) Mezhericher M., Ladizhensky I. and Etlin I. U.S. patent application Ser. No. 15/324,902, filed Jan. 9, 2017; (3) Mezhericher M., Ladizhensky I. and Etlin I. Liquid-atomization Method and Device. European Patent Application No. 15848995.5, filed Feb. 23, 2017; (4) Mezhericher M., Ladizhensky I. and Etlin I. Liquid-atomization Method and Device. PCT/IL2015/050857; Publication No. WO2016/055993, published on Apr. 14, 2016; and (5) Mezhericher M., Ladizhensky I. and Etlin I. Liquid-Atomization Method and Device. Israel Patent Application, No. 235083, filed Oct. 7, 2014.

Referring back to FIG. 1 and FIG. 2, in some embodiments, the atomizer device may employ a sub-micron droplet mode (e.g., droplets of a diameter of 100-1000 nm are obtained), or use a dual droplet size mode (e.g., sub-micron droplets and 1-100 µm droplets are obtained). The size distribution of the aerosol droplets may be controlled via various conditions. For example, the atomizing gas pressure or the properties of the liquid precursor may be controlled to change the droplet size. In some cases, the atomizer may be heated to adjust the properties of the precursor liquid, thereby controlling the droplet size and to facilitate efficient droplet generation. Alternatively, various other atomization methods for obtaining different droplet size distributions can be used, and combined together to produce materials with specified size distributions.

(Step 103) Preheating control. The aerosol obtained from the step 102 may be passed through a temperature controlled preheating region for particle morphology control before delivery to the high-temperature reactive zone downstream. The size distribution from the step 102 (e.g., sub-micron or dual-mode described above), coupled with the preheating temperature control in step 103 and synthesis temperature control in step 104, can be used to control the size distribution of the synthesized product particles, for example, monodisperse ultrafine particles (e.g., 5-100 nm size), or polydisperse particles (e.g., 5 nm-10 μm size).

In some embodiments, the aerosol flow can be preheated in a delivery line before feeding into a reactor, to facilitate control of the synthesized particle morphology. The preheating energy may be provided by electrical heating, combustion heating, or heat exchange with recirculated high-temperature exhaust gas described herein. In one example, the preheating temperatures can be between 50° C. and 500° C. to suppress or eliminate the formation of (1) hollow particles, or (2) sub-10 nm nanoparticles formed from the gas-phase-to-particle mode, by slowing the evaporation rate of solvent from the droplet (e.g., as compared to directly feeding into the reactor) and therefore providing time for the solute to diffuse within the droplets. A residence time in the preheating section may be 0.1-10 seconds.

(Step 104) reactor reaction. The aerosol from the step 103 is delivered to a reactive zone, where the solvent liquid evaporates and reacts in the high-temperature reactor to form product particles. A reactor or an alternative apparatus may provide the high-temperature reactive zone. Chemical conversion of the precursor into product particles occurs inside the reactor. The high-temperature may be achieved with a flame, a heated volume, a plasma, laser heating, electric heating, or their combination with or without additional gaseous precursors. Active flame, plasma radicals, or other energy sources can accelerate the production of homogeneous particles. The aerosol may pass directly through the reactive zone, or high-temperature gas(es) may be generated (e.g., by the flame or another energy source) and mixed with the aerosol stream to burn in the reactive zone (e.g., methane can be added to the aerosol stream and the mixture can be burnt with oxygen in a non-premixed co-flow burner configuration).

In some embodiments, the reaction temperature in the reactor may be 500-10000° C., the pressure of the reactor may be 500 mbar-10 bar, and the residence time in the reactor may be 0.1-10 seconds. The high-temperature reactive zone may be formed by the burning of fuel and oxidizer. The fuel may contain carbon (e.g., methane, ethylene, propane and other alkanes and oxygenated fuels like alcohols and ethers). Alternatively, the fuel may comprise hydrogen (e.g., for high purity applications). The oxidizer stream may comprise air or a tailored oxygen/inert gas mixtures. The reactive zone may be surrounded by a co-flow of inert or oxidizing gases. The flowrates of the gases may be controlled using any ordinary method of flow regulation.

In some embodiments, the flame provides heat that evaporates the solvent and drives the reaction of the precursors into product particles. The flame also provides active radicals that accelerate the formation of crystalline product particles. The combination of flame structure, reactor residence time, fuel-oxidizer mixture, and precursor solvent controls the synthesis conditions, thereby controlling the crystallinity (e.g., crystal phase, crystallite size), hollowness, core-shell, or dense particles.

In some embodiments, the high-temperature reactive zone may be formed using a plasma discharge. In this case, the aerosol stream is introduced into the reaction chamber together with additional gases required for the formation of the product particles. The additional gases may comprise air, nitrogen, helium, argon, ammonia, or fluorine-containing gases. Electrical energy is imparted to the aerosol flow. For example, the reactor may comprise two electrodes with a voltage applied to them to generate a discharge, thereby forming the plasma. The discharge raises the gas temperature to evaporate the solvent. Active species in the plasma may assist in driving the chemical reactions, which form the product particles. In this case, the nature of the plasma discharge and flow residence time controls the morphology and the crystallinity of the product particles.

In some embodiments, the high-temperature reactive zone is formed by an electrically-heated reactor, for example, in a tubular furnace configuration. The reactor provides heat to the aerosol stream, evaporating the droplets and forming the product particles. The reactor temperature and residence time control crystallinity, microstructure, and morphology of the product particles.

Regardless of the reactor configuration, the material synthesis method comprises two primary routes for forming the product particles: droplet-to-particle (one particle forms from each droplet) and gas-to-particle (multiple particles form from each vaporized droplet) formation routes.

For the droplet-to-particle route, the solvent evaporates more slowly, and one particle forms from each droplet. The product particle size is between 10 nm and 10 μm (e.g., in the range of 10-50 nm, 50-100 nm, 100 nm-500 nm, 500 nm-1 μm, 1-10 μm, etc.), depending primarily on the atomizer device operation mode, precursor concentration, and preheating and reactor synthesis temperatures. For example, in the dual-mode, the synthesized particles may be polydisperse (e.g., 5 nm-10 μm). For another example, higher precursor concentrations may result in formation of larger particles. For another example, higher preheating temperatures may lead to formation of dense, smaller particles. For another example, lower synthesis temperatures may favor the formation of particles via this droplet-to-particle route. Further, it is possible to enhance the formation of hollow particles (shell formation) by using a low preheating temperature or no preheating, with intermediate downstream synthesis temperatures.

For the gas-to-particle route, the precursor is first vaporized into the gas-phase, and then particles form via nucleation and growth from the precursor vapor. In some embodiments, high synthesis temperatures (e.g., ~2500° C.) and/or highly energetic plasma discharges (e.g., ~10000° C.) may drive the gas-to-particle synthesis route to form ultrafine nanoparticles (5-100 nm) from the gas phase. This formation route may depend on the atomizer device operation mode, and preheating and reactor synthesis temperatures. For example, in the sub-micron atomizer operation mode, the particles may be predominantly ultrafine (5-100 nm). For another example, in the sub-micron atomizer operation mode, the high surface area of the droplets enhances the formation of ultrafine nanoparticles (5-100 nm) from the gas phase. For another example, preheating suppresses the gas-to-particle formation route by at least reducing the droplet vaporization rate. For another example, high synthesis temperatures favor the gas-to-particle formation route. Further, the reactor pressure may be atmospheric or the reactor pressure may be varied to adjust the particle morphology. Low reactor pressures may promote the formation of ultrafine nanoparticles (5-100 nm) via the gas-to-particle synthesis route due to higher vaporization rate at lower pressures.

(Step 105) particle collection. Through the variation of preheating and synthesis temperature following the gas-phase-to-particle mode, droplet-to-particle mode, and shell-to-hollow-particle mode, the morphology of nanoparticles such as monodispersed ultra-fine particles (5-100 nm), hollow particles, and polydisperse larger particles (5 nm-10 μm) can be controlled. The product particles may be collected from the process exhaust stream or directly deposited on a surface (thin films). The material synthesis system may comprise at least one of a membrane filter, electrostatic collector, a bag filter, a cold trap, or a substrate for collecting the synthesized particles from an exhaust stream of the reactor. For example, the particles may be collected from the exhaust stream using membrane filters, electrostatic collection, bag filters, cold trap, or any other suitable method. For another example, the nanoparticles can be deposited directly onto a substrate to form nanostructured thin films.

(Step 106) additional processing. Additional processing (e.g., annealing) may be implemented to improve the particle crystalline structure. The annealing temperature and duration can be configured to control the crystal phase and crystallite size. The synthesized material can be obtained at (step 107).

FIG. 4A to FIG. 11 illustrate controlling the synthesis of metal oxide nanoparticles and lithium-containing transition metal oxide particles (e.g., $Li(Ni_{0.33}Mn_{0.33}Co_{0.33})O_2$ for lithium-ion battery cathodes) with three different particle morphologies (monodispersed ultra-fine particles (5-100 nm), hollow particles, and polydisperse larger particles (5 nm-10 μm)).

In some embodiments, nitrates of lithium metal and nitrates of the transition metals nickel, manganese, and cobalt are dissolved in deionized water. The elemental ratios of the transition metals may be arbitrarily chosen. In one example, the atomic ratio of transition metals is 1:1:1, with the ratio of total transition metals to lithium 1:1, to form the electrochemically active cathode material $Li(Ni_{0.33}Mn_{0.33}Co_{0.33})O_2$. The total molar concentration of precursor salts in the mixture is 1 mol/L. In another example, the ratio of lithium to a single transition metal may be 1:2 to form the electrochemically active material $LiMn_2O_4$. In another example, a single metal precursor may be used, to form the metal oxide product $M_2O_3$, where M is a metal (e.g., yttrium, Y). For example, $Y_2O_3$ particles can be formed (where yttrium nitrate is dissolved in deionized water forming precursor liquid, which is supplied into the chamber of the atomization device).

In some embodiments, the prepared precursor solution is added to the atomizer described above. An atomizing gas comprising air is delivered to the atomizer at a pressure of approximately 2 bar(g). An aerosol of precursor solution droplets is generated in the atomizer, according to the process described above.

The precursor solution droplets may have a volume-based (mass-based) size distribution as shown in FIG. 4A-FIG. 4D. FIG. 4A and FIG. 4B are respectively graphical illustrations of volume-based and number-based droplet size distribution for a hydrocarbon-liquid-fuel-based precursor solution in the sub-micron mode, consistent with various embodiments of the present disclosure. In FIG. 4A and FIG. 4B, the droplets obtained from the corresponding liquid precursor are 95 RON (Research Octane Number) gasoline fuel droplets, with a viscosity of 0.46 mPa·s, a surface tension of 17 mN/m, and a density of 734 $kg/m^3$. As shown in FIG. 4A, in the sub-micron aerosol mode, the droplet mass is evenly distributed between the sub-micron range and the 1-100 μm range. There exists a cubic relationship between the diameter and volume of spherical droplets. For example, 1000 droplets with a diameter of 100 nm have the same total volume as a single droplet with a diameter of 1 μm. Therefore, the right peak in FIG. 4A may correspond to very few micron-size droplets in FIG. 4B, and as shown in FIG. 4B, the vast majority (e.g., more than 99% by number) of droplets are in the sub-micron range (e.g., 100-1000 nm size). This sub-micron distribution is more suitable for producing monodisperse particles in the synthesis process.

FIG. 4C and FIG. 4D are respectively graphical illustrations of volume-based and number-based droplet size distribution for a water-based precursor solution for the dual-mode, consistent with various embodiments of the present disclosure. In FIG. 4C and FIG. 4D, the droplets obtained from the corresponding liquid precursor are deionized water droplets, with a viscosity of 0.89 mPa·s, a surface tension of 72.8 mN/m, and a density of 998 $kg/m^3$. As shown in FIG. 4C, in the dual mode, the mass is weighted toward the 1-100 μm droplet size range. As shown in FIG. 4D, by numbers, the atomizer produces droplets of a broader size distribution than the sub-micron mode, and the aerosol comprises both sub-micron and larger droplets 1-100 μm, which correspond to the "dual modes." This dual-mode distribution is more suitable for producing polydisperse particles in the synthesis process.

In some embodiments, the aerosol can be delivered through a preheating section with an exit temperature of, for example, 50-500° C. For example, the preheating may be delivered by electrical resistance heaters. The aerosol may be delivered to the reactive zone. The reactive zone may comprise a diffusion flame burner operated with gases containing, for example, methane, oxygen, and nitrogen. An air co-flow surrounds the burner. The entire reactive zone may be enclosed and operated at atmospheric pressure. The aerosol flow is injected into the burner. The adiabatic temperature of the mixed gases is between 700-2500° C. The residence time of the aerosol in the reactor is 0.1-10 seconds (e.g., 0.5-5 seconds). The product particles may be collected from an exhaust stream using a filter assisted with a vacuum pump, or using an electrostatic precipitator. The particles may also be directly deposited onto a substrate for the formation of thin films.

Figure 5:
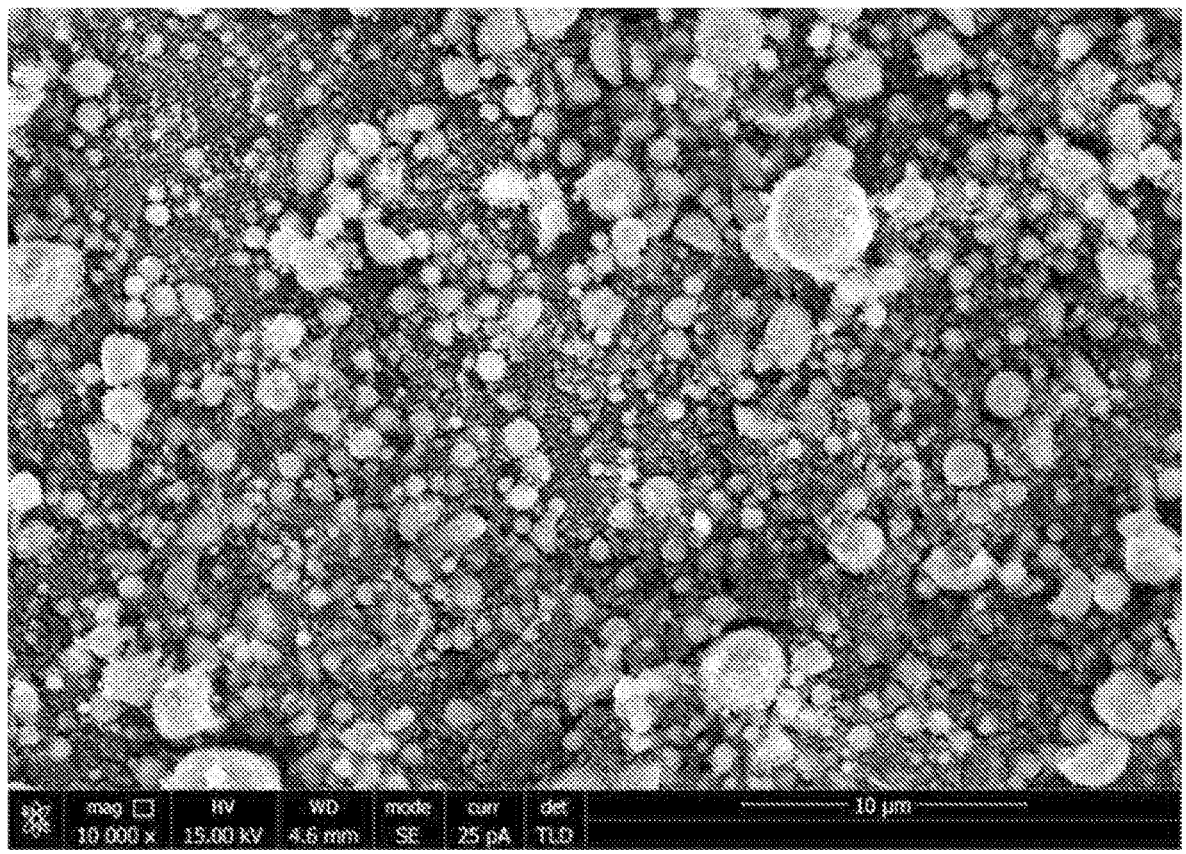
FIG. 5 is a scanning electron microscope (SEM) image of polydisperse $Li(Ni_{0.33}Mn_{0.33}Co_{0.33})O_2$ particles synthesized from the dual-mode aerosol, consistent with various embodiments of the present disclosure.

FIG. 5 is a scanning electron microscope (SEM) image of polydisperse Li(Ni$_{0.33}$Mn$_{0.33}$Co$_{0.33}$)O$_2$ particles synthesized from the dual-mode aerosol, consistent with various embodiments of the present disclosure. According to the above-described material synthesis method, the polydisperse Li(Ni$_{0.33}$Mn$_{0.33}$Co$_{0.33}$)O$_2$ particles may be synthesized at a temperature of 900° C. with a preheating temperature of 230° C. The preheating can prevent the formation of hollow particles. FIG. 5 has thus demonstrated the polydisperse particle synthesis using the atomizer device aerosol mode control and synthesis temperature control.

Figure 6A:
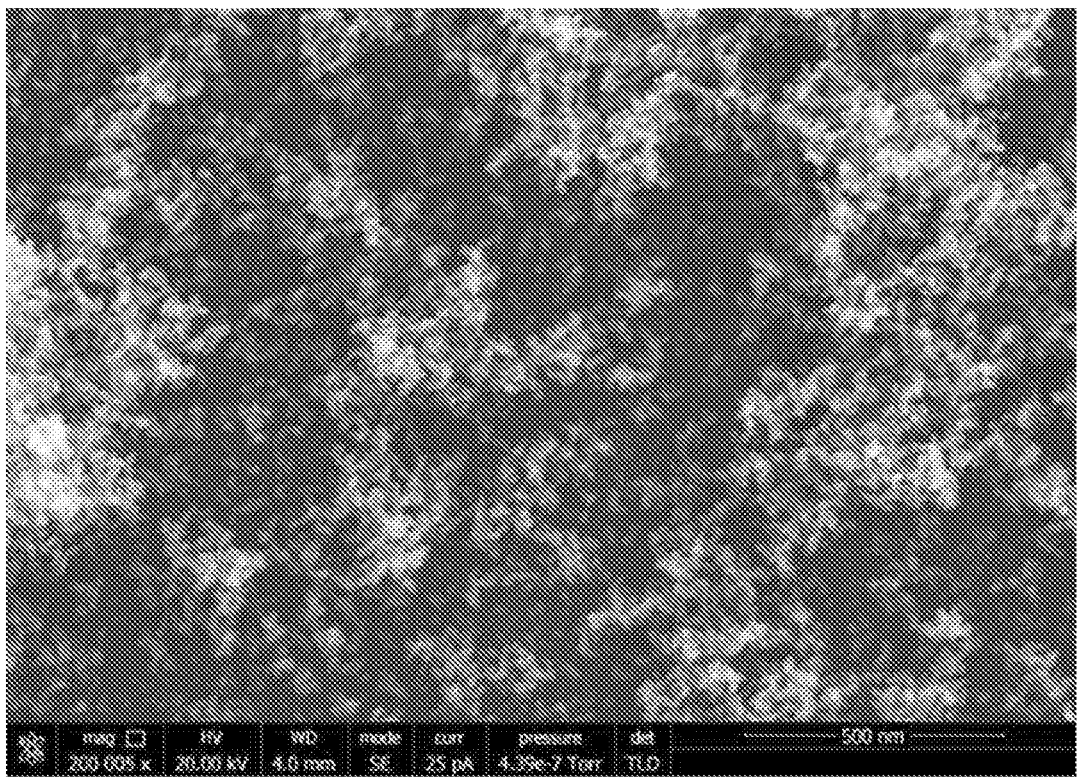
FIG. 6A is an SEM image of synthesized $LiMn_2O_4$ battery cathode material, consistent with various embodiments of the present disclosure.
Figure 6B:
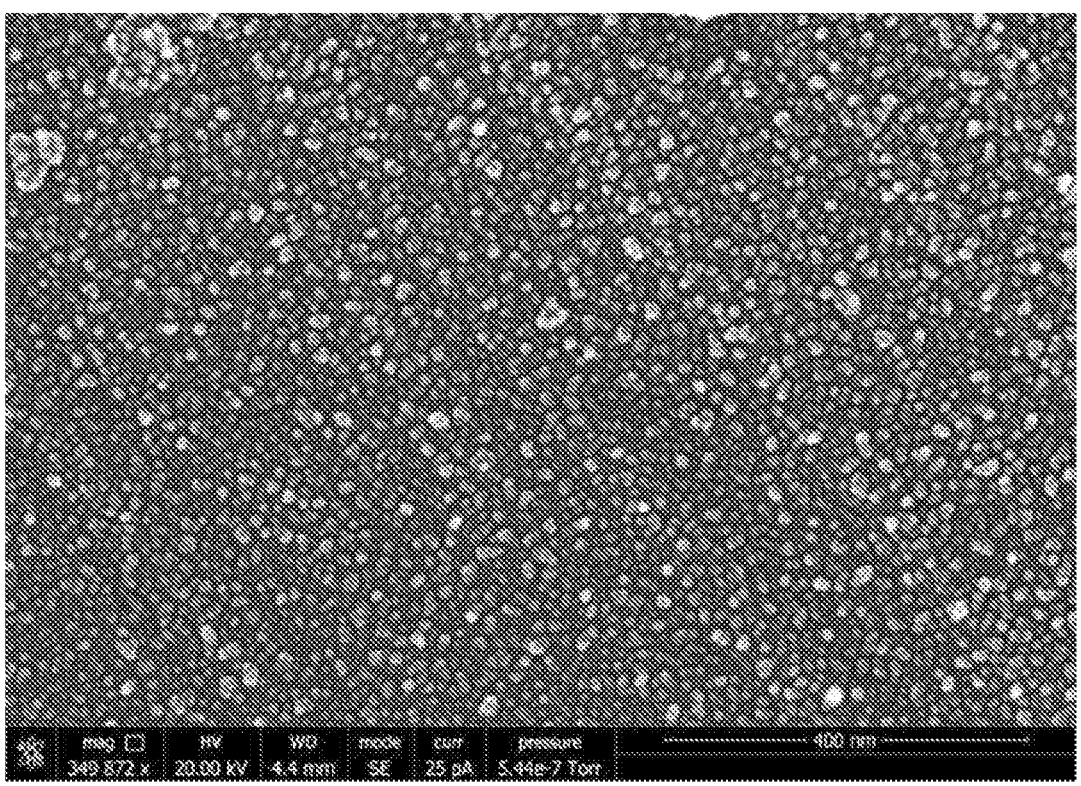
FIG. 6B is an SEM image of synthesized $Y_2O_3$ deposited onto an aluminum foil, consistent with various embodiments of the present disclosure.

FIG. 6A is an SEM image of synthesized LiMn$_2$O$_4$ battery cathode material, consistent with various embodiments of the present disclosure. According to the above-described material synthesis method, ultrafine LiMn$_2$O$_4$ battery cathode particle material may be prepared at a process temperature of 2500° C. FIG. 6B is an SEM image of synthesized Y$_2$O$_3$ deposited onto an aluminum foil, consistent with various embodiments of the present disclosure. According to the above-described material synthesis method, ultrafine Y$_2$O$_3$ particles deposited onto an aluminum foil may be prepared at a process temperature of 2500° C. FIG. 6A and FIG. 6B have thus demonstrated ultrafine particle synthesis using synthesis temperature control.

Figure 7:
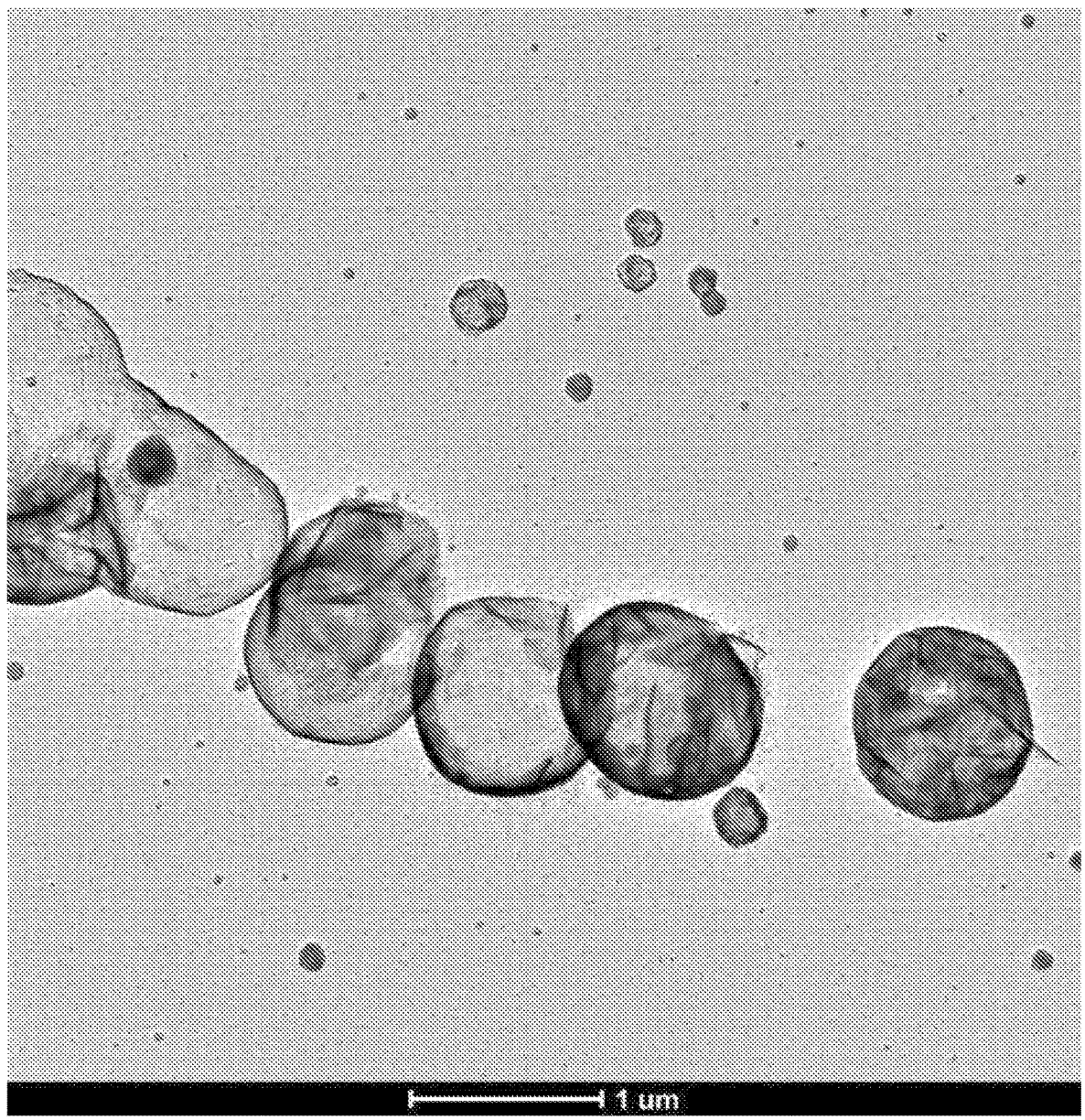
FIG. 7 is a transmission electron microscope (TEM) image of synthesized hollow metal oxide $Y_2O_3$ particles, consistent with various embodiments of the present disclosure.

FIG. 7 is a transmission electron microscope (TEM) image of synthesized hollow metal oxide Y$_2$O$_3$ particles, consistent with various embodiments of the present disclosure. According to the above-described material synthesis method, hollow metal oxide Y$_2$O$_3$ particles may be prepared from micron-sized droplets and heated in a reactive zone at a process temperature of 900° C. without preheating. In the absence of preheating, the rapid solvent evaporation in the reactor may cause the solute to precipitate on the droplet surface, and because the downstream synthesis temperature is low, hollow product particles are formed. FIG. 7 has thus demonstrated hollow-structured particle synthesis.

Figure 8A:
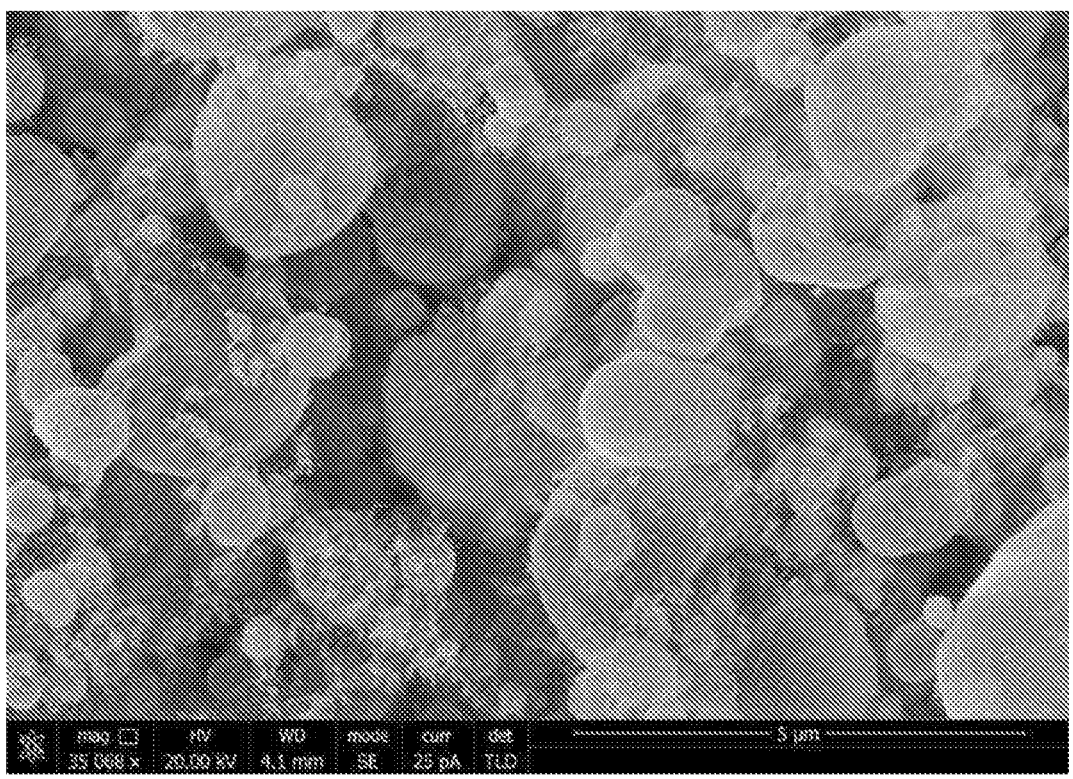
FIG. 8A and FIG. 8B are SEM images of synthesized metal oxide $Y_2O_3$ particles, consistent with various embodiments of the present disclosure.
Figure 8B:
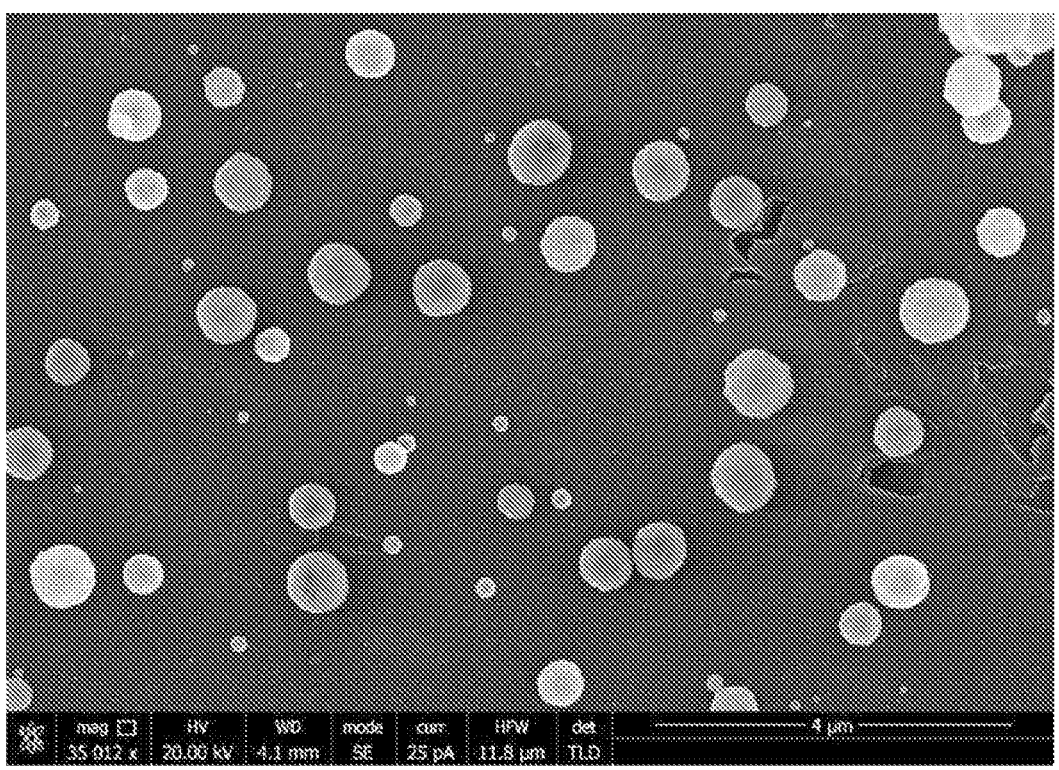

FIG. 8A and FIG. 8B are SEM images of synthesized metal oxide Y$_2$O$_3$ particles, consistent with various embodiments of the present disclosure. FIG. 8A shows synthesized metal oxide Y$_2$O$_3$ particles prepared at a process temperature of 1600° C. without preheating. The resultant Y$_2$O$_3$ particles are hollow and have a large (>1 µm) size, and many nanoparticles are also formed by the gas-to-particle route.

FIG. 8B shows synthesized metal oxide Y$_2$O$_3$ particles prepared at a process temperature of 1600° C. with preheating at 200° C., and otherwise similar to the process of FIG. 8A. The resultant Y$_2$O$_3$ particles are dense, because during the slow preheating, no shell is formed. Further, nanoparticle formation from the gas-phase is significantly reduced. FIG. 8A and FIG. 8B have thus demonstrated particle morphology control using preheating.

Figure 9A:
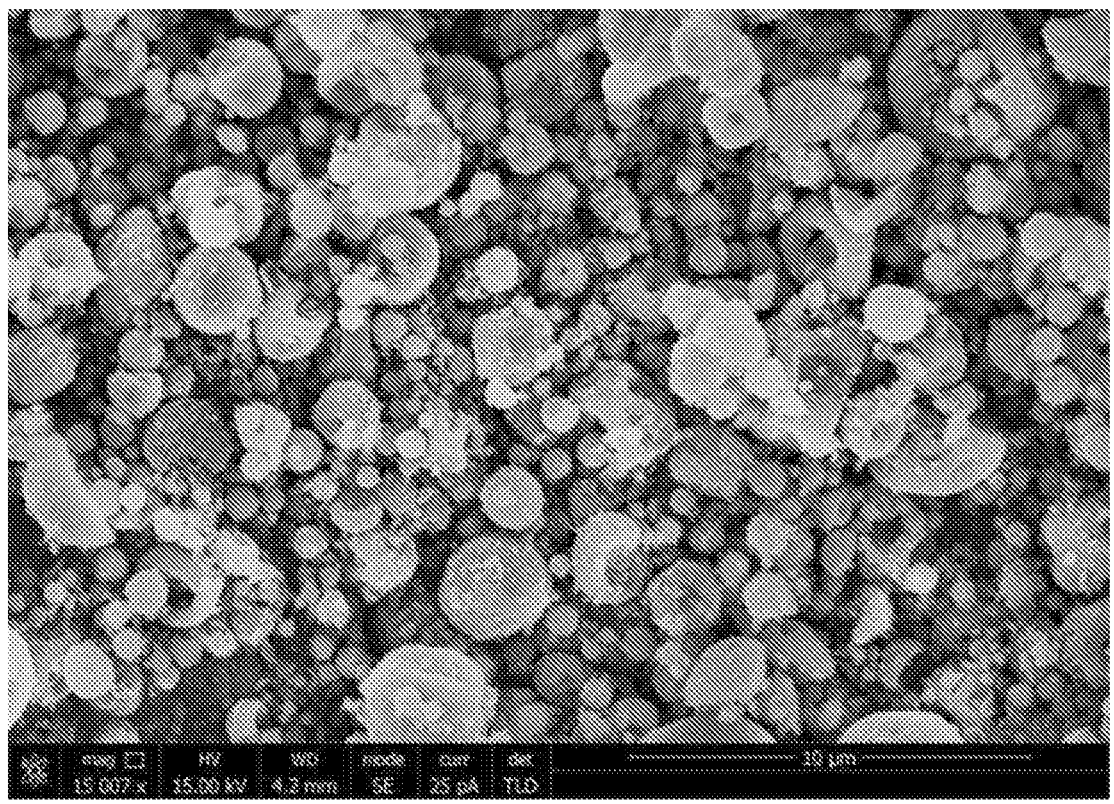
FIG. 9A is an SEM image of $Li(Ni_{0.33}Mn_{0.33}Co_{0.33})O_2$ Li-ion battery materials synthesized with the disclosed method, consistent with various embodiments of the present disclosure.
Figure 9B:
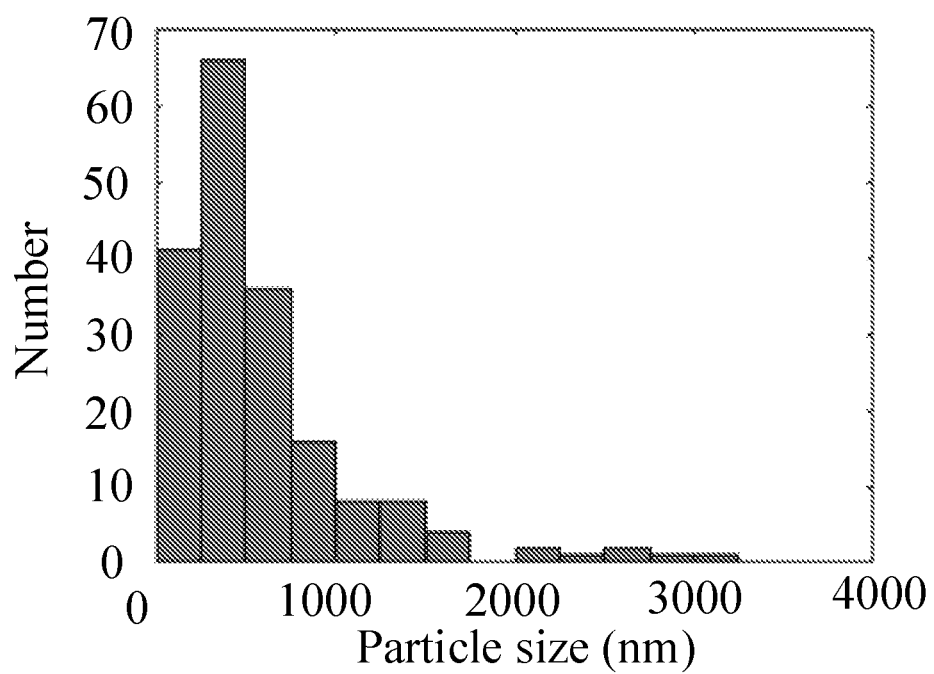
FIG. 9B is a graphical illustration of number-based particle size distribution of the material shown in FIG. 9A, consistent with various embodiments of the present disclosure.

FIG. 9A is an SEM image of Li(Ni$_{0.33}$Mn$_{0.33}$Co$_{0.33}$)O$_2$ Li-ion battery materials synthesized with the disclosed method, and FIG. 9B is a graphical illustration of number-based particle size distribution of the material shown in FIG. 9A, consistent with various embodiments of the present disclosure. The material may be prepared using the above-described atomizer device, and followed by a preheating temperature of 110° C. and a process temperature of 1250° C.

Figure 9C:
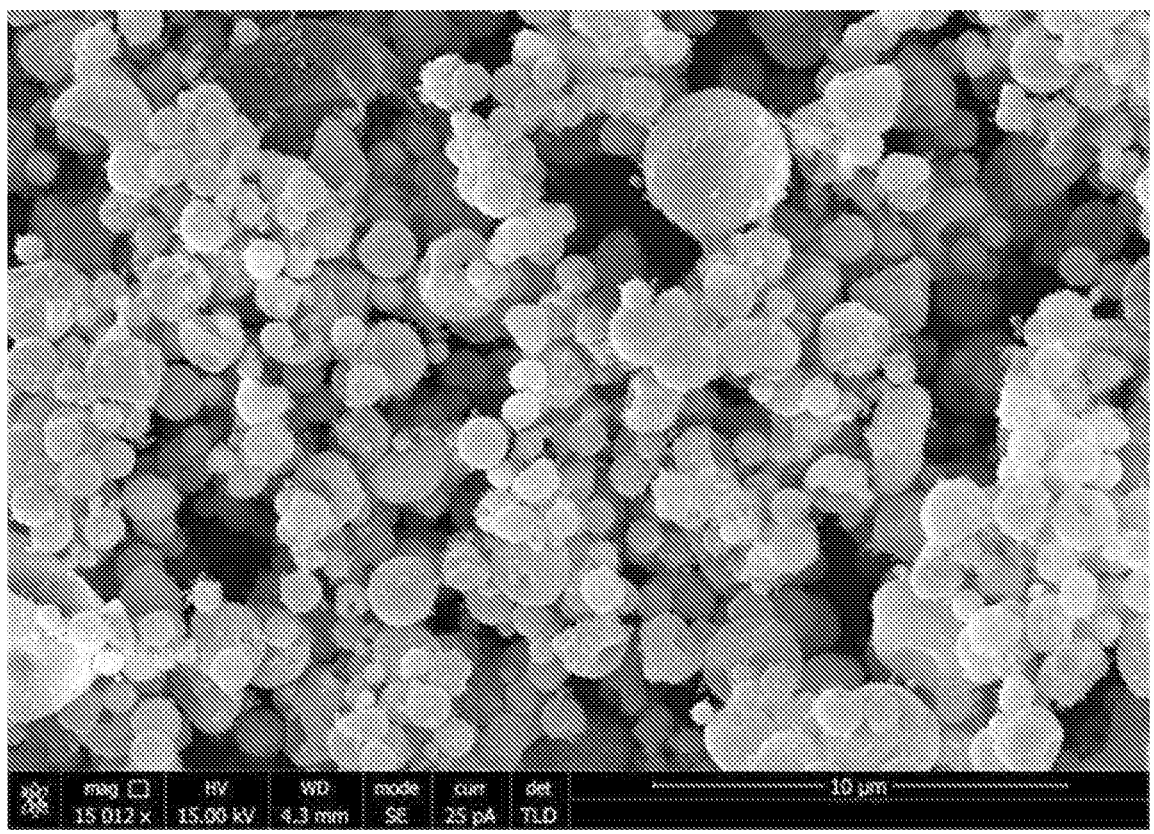
FIG. 9C is an SEM image of $Li(Ni_{0.33}Mn_{0.33}Co_{0.33})O_2$ Li-ion battery materials synthesized with a conventional (ultrasonic) atomization method.
Figure 9D:
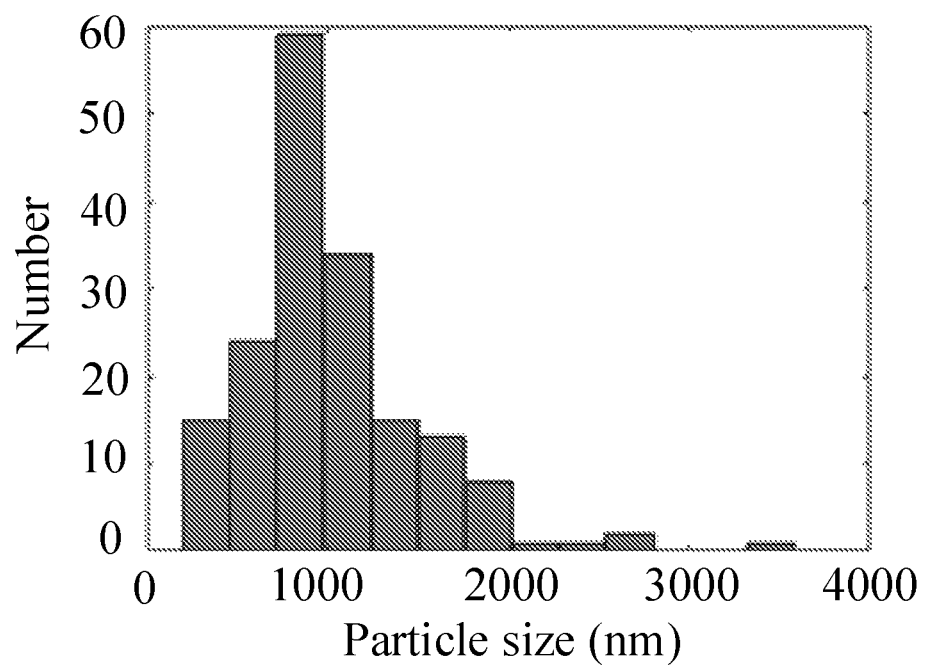
FIG. 9D is a graphical illustration of number-based particle size distribution of the material shown in FIG. 9C.

FIG. 9C is an SEM image of Li(Ni$_{0.33}$Mn$_{0.33}$Co$_{0.33}$)O$_2$ Li-ion battery materials synthesized with a conventional ultrasonic atomization method, and FIG. 9D is a graphical illustration of number-based particle size distribution of the material shown in FIG. 9C. Compared with the conventional method, FIG. 9A and FIG. 9B show that the disclosed synthesis method using the atomizer device, for example, a microspray atomizer, produces a mixture of many smaller and some larger particles, and therefore the resultant material has a higher packing density and an improved volumetric energy density. Also, using the atomizer device, the median particle size is smaller than the particles produced using the conventional atomization technique. FIG. 9A and FIG. 9B have thus demonstrated using the atomizer device to produce polydisperse nanoparticles.

Figure 10:
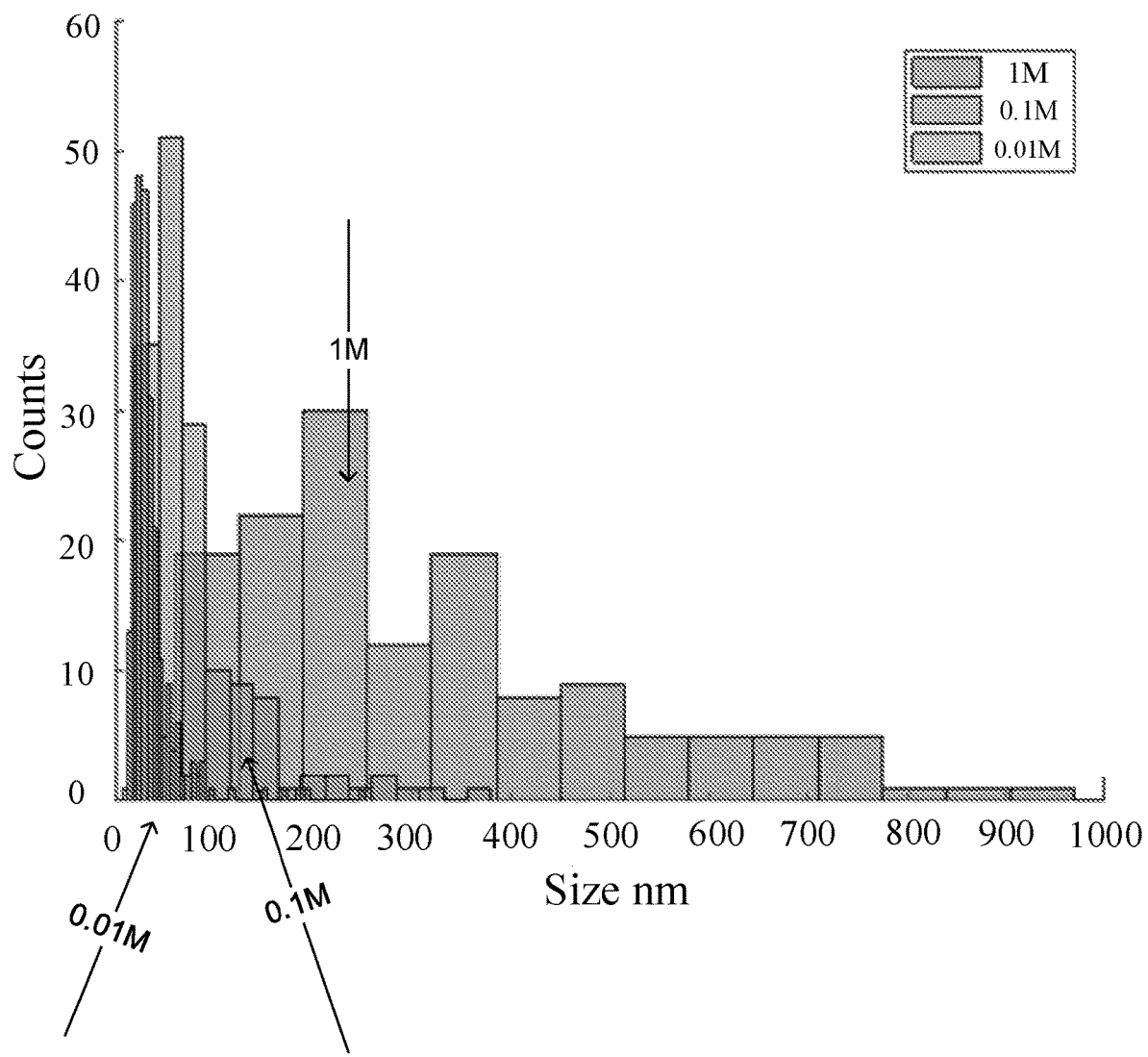
FIG. 10 is a graphical illustration of particle size distribution of produced metal oxide particles, consistent with various embodiments of the present disclosure.

FIG. 10 is a graphical illustration of particle size distribution of produced metal oxide particles, consistent with various embodiments of the present disclosure. FIG. 10 shows polydisperse nanoparticle synthesized using the dual mode aerosol, and tailoring of the precursor concentration to change the median particle size. Particle distributions corresponding to three different precursor concentrations (1M, 0.1M, and 0.01M) are shown, in which higher precursor concentrations result in larger particles being produced. FIG. 10 has thus demonstrated the control of particle size distribution using sub-micron aerosols.

Figure 11:
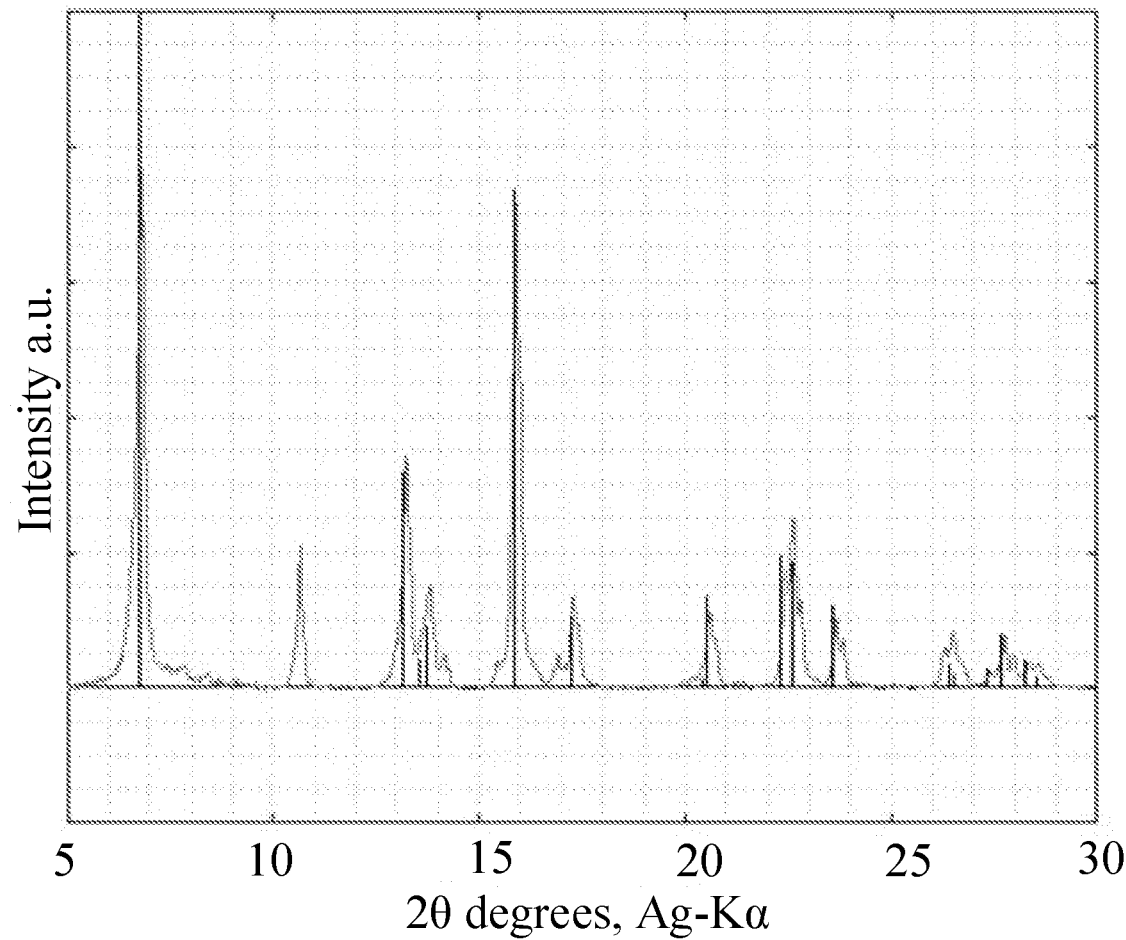
FIG. 11 is an X-ray diffraction pattern of annealed lithium NMC (lithium nickel manganese cobalt oxide) powders, consistent with various embodiments of the present disclosure.

FIG. 11 is an X-ray diffraction pattern of annealed lithium NMC (lithium nickel manganese cobalt oxide) powders, consistent with various embodiments of the present disclosure. The materials can be applied in lithium-ion batteries. The illustrated peaks correspond to ICDD (International Center for Diffraction Data) datacard 056-0147, indicating the crystalline structure of the material.

FIG. 12 is a flowchart illustrating an exemplary material synthesis method 600, consistent with various embodiments of the present disclosure. The operations of the exemplary material synthesis method 600 and its various steps presented herein are intended to be illustrative. Depending on the implementation, the exemplary material synthesis method 600 may include additional, fewer, or alternative steps performed in various orders or in parallel.

Step 601 comprises adding at least one liquid precursor solution to an atomizer device. In some embodiments, the at least one liquid precursor solution may comprise a metal salt dissolved or diluted in a solvent. The metal salt may comprise at least one of alkaline, transition, or lanthanide metals. The solvent may comprise at least one of water, metal alkoxide, or one or more hydrocarbon liquids. The median size of the synthesized particles by the method 600 may increase with the molar concentration of the liquid precursor solution. The at least one liquid precursor solution may have a dynamic viscosity of less than 0.2 Pa·s and a molar concentration of 0.001-2 mol/L (e.g., 0.1-2 mol/L).

Step 602 comprises generating by the atomizer device an aerosol comprising liquid droplets. In some embodiments, for a sub-micron mode of the atomizer device, at least 99% of the liquid droplets by number have a diameter of less than 1 µm and an arithmetic mean diameter between 0.1 and 1 µm, and the particles produced by the method 600 are monodisperse with an average diameter between 5-100 nm. For a dual mode of the atomizer device, the liquid droplets are sub-micron sized in diameter or 1-100 µm in diameter, and the particles produced by the method 600 are polydisperse with diameters between 5 nm-10 µm. For example, the atomizer device may comprise a microspray atomizer. Generating the aerosol may comprise introducing an atomizing gas flow into the microspray atomizer and generating the aerosol in the microspray atomizer. The atomizing gas may comprise at least one of an oxidizer gas, an inert gas, or a fuel gas. The atomizing gas flow may have a pressure of 1-100 bar (e.g., 1-10 bar).

Optional step 603 comprises transporting the aerosol to a preheating section for evaporating at least a portion of the one or more solvents from the aerosol. For example, preheating the aerosol may be performed at a temperature between 50° C. and 500° C. for evaporating at least the portion of the one or more solvents from the aerosol for 0.1-10 seconds. Energy for the preheating can be provided by at least one of electrical heating, combustion heating, or heat exchange with a recirculated exhaust gas.

Step 604 comprises transporting the aerosol to a reactive zone for evaporating one or more solvents from the aerosol. The reactive zone may comprise at least one of a flame, plasma, furnace, laser heating, or electric heating for supplying energy. The reactive zone may be at a temperature of 500-10000° C. and a pressure of 500 mbar-10 bar. Transporting the aerosol to the reactive zone for evaporating one or more solvents from the aerosol may comprise transporting the aerosol to the reactive zone for evaporating one or more solvents from the aerosol for 0.1-10 seconds (e.g., 0.5-5 seconds). In some embodiments, transporting the aerosol to the reactive zone may comprise transporting the aerosol to the reactive zone without preheating, and the synthesized particles by the method 600 are hollow-structured.

Step 605 comprises collecting particles synthesized from at least evaporating the aerosol. In some embodiments, collecting the synthesized particles comprises collecting the synthesized particles from an exhaust stream of the reactive zone by membrane filtering, electrostatic collection, bag filtering, or cold trap. The synthesized particles may comprise a metal oxide, fluoride, sulphide, oxysulphide, silicate, nitrate or nitride. The synthesized particles may comprise homogeneous and non-aggregated particles. For example, the synthesized particles may comprise particles selected from a group consisting of: monodisperse $Li(Ni_{0.33}Mn_{0.33}Co_{0.33})O_2$ particles with an average diameter between 5-100 nm, hollow-structured $Li(Ni_{0.33}Mn_{0.33}Co_{0.33})O_2$ particles, $LiMn_2O_4$ which has a mean diameter between 5-10 nm, and polydisperse $Li(Ni_{0.33}Mn_{0.33}Co_{0.33})O_2$ particles with diameters between 5 nm-10 μm. Further details of the method 600 can be found above with reference to FIG. 1 to FIG. 11.

FIG. 13 is a flowchart illustrating an exemplary material synthesis method 700, consistent with various embodiments of the present disclosure. The operations of the exemplary material synthesis method 700 and its various steps presented herein are intended to be illustrative. Depending on the implementation, the exemplary material synthesis method 700 may include additional, fewer, or alternative steps performed in various orders or in parallel.

Step 701 comprises adding a first precursor solution to an atomizer device to generate a first aerosol comprising first liquid droplets. Step 702 comprises transporting the first aerosol to a reactive zone for evaporating one or more first solvents from the first aerosol to obtain first synthesized particles of a first size distribution. Step 703 comprises adding a second precursor solution to the atomizer device to generate a second aerosol comprising second liquid droplets. Step 704 comprises transporting the second aerosol to the reactive zone for evaporating one or more second solvents from the second aerosol to obtain second synthesized particles of a second size distribution. Before the step 703 is performed, the atomizer device may be emptied such that no first precursor solution is left. In some embodiments, the first precursor solution may comprise gasoline, and the second precursor solution may comprise water. Alternatively, the first precursor solution may comprise water, and the second precursor solution may comprise gasoline. In addition, various other liquids can be used instead of gasoline and water. The liquids may have various different viscosity, density, and surface tension measurements. In some embodiments, droplets of higher viscosity, surface tension, and density (e.g., no less than deionized water in such measurements) may be used for the dual mode of the atomizer device, while droplets of lower viscosity, surface tension, and density (e.g., no more than 95 RON gasoline in such measurements) may be used for the submicron mode of the atomizer device.

In some embodiments, generating the first or second aerosol comprises disintegrating liquid films of the first or second precursor solution respectively with gas jets; and the first and second precursor solutions are associated with different surface tensions.

In some embodiments, the first and second size distributions are selected from monodisperse and polydisperse distributions (e.g., the first size distribution may be monodisperse and the second distribution may be polydisperse and vice versa). The monodisperse distribution is associated with an average diameter between 5-100 nm, and is obtained from corresponding liquid droplets that at least 99% by number of which have a diameter of less than 1 μm or an arithmetic mean diameter between 0.1 and 1 μm. The polydisperse distribution is associated with diameters between 5 nm-10 μm, and is obtained from corresponding liquid droplets that are sub-micron in diameter or 1-100 μm in diameter. The monodisperse distribution may correspond to the above-described sub-micron mode, and the polydisperse distribution may correspond to the above-described dual mode. Various other synthesis conditions (e.g., preheating and reactor temperature, pressure, and residence time) can be referred to from the above descriptions.

As such, various materials can be efficiently synthesized by the disclosed method. For example, controlling the nanostructure and size of cathode and anode materials (e.g., layered transition metal oxide particles such as $Li(Ni_{0.33}Mn_{0.33}Co_{0.33})O_2$) allows reduction of Li-ion diffusion time, increased surface areas and packing density, and optimization of electronic conduction to enhance battery specific capacity and charge/discharge rates, while also reducing adverse chemical reactions and/or structural changes. The particle size control methods disclosed herein can, in a single processing step, benefit battery calendar lifetime, cycle numbers, and battery safety. The single processing step can obviate the separation/sieving required in existing technologies. A further example is the tailoring of optical properties to improve absorption efficiency of photoactive materials such as transition-metal doped $TiO_2$. Still another example is the increased catalytic activity of nanomaterials (e.g., rare-earth perovskites or noble metals on oxide supports) due to the extremely high specific surface area. Yet another example is to control particle size and morphology of thermal-chemical energy storage materials to achieve efficient and fast energy storage. A further example is the synthesis of thin films using a combination of different nanomaterials to control the sensitivity and functionality of thin films.

The present disclosure recites many ranges in, for example, temperature, pressure, dimension, time, etc. In some instances, a broad range is given with exemplary narrower ranges. These exemplary narrower ranges are not repeated in other instances where the broad range is described, but are also applicable in those instances.

Advantages of the disclosed material synthesis method include: versatility (nanoparticles of different materials can be manufactured, using solvents with very different properties), simplicity, controllable particle sizes including a monodisperse ultrafine mode and a polydisperse mode, very short process time, scalability of production rate, and economic efficiency (low costs required for construction and operation).

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The Detailed Description is not to be taken in a limiting sense, and the scope of various embodiments is defined only by the appended claims, along with the full range of equivalents to which such claims are entitled.

What is claimed is:

1. A material synthesis method, comprising:
adding at least one liquid precursor solution to an atomizer device;
injecting an atomizing gas flow into the atomizer device, wherein a first part of the atomizing gas is released beneath a surface of the liquid precursor solution and a second part of the atomizing gas is released above the surface of the liquid precursor solution;
generating by the atomizer device an aerosol with dual size modes comprising a sub-micron droplet mode and a micron droplet mode;
transporting the aerosol to a reactive zone for evaporating one or more solvents from the aerosol; and
collecting synthesized particles.

2. The method according to claim 1, wherein:
the at least one liquid precursor solution comprises a metal salt dissolved or diluted in a solvent;
the metal salt comprises at least one of alkaline, transition, or lanthanide metals;
the solvent comprises at least one of water, metal alkoxide, or one or more hydrocarbon liquids; and
the median size of the synthesized particles increases with the molar concentration of the liquid precursor solution.

3. The method according to claim 1, wherein the at least one liquid precursor solution has a dynamic viscosity of less than 0.2 Pas and a molar concentration of 0.001-2 mol/L.

4. The method according to claim 1, wherein: the aerosol has a droplet diameter of 100-1000 nm in the sub-micron droplet mode and a droplet diameter of 1-100 µm in the micron droplet mode.

5. The method according to claim 1, wherein:
the atomizing gas comprises at least one of an oxidizer gas, an inert gas, or a fuel gas; and
the atomizing gas flow has a pressure of 1-100 bar.

6. The method according to claim 1, wherein, before transporting the aerosol to the reactive zone, the method further comprises:
transporting the aerosol to a preheating section; and
preheating the aerosol at a temperature between 50° C. and 500° C. for evaporating at least a portion of the one or more solvents from the aerosol for 0.1-10 seconds.

7. The method according to claim 6, wherein:
energy for the preheating is provided by at least one of electrical heating, combustion heating, or heat exchange with a recirculated exhaust gas.

8. The method according to claim 1, wherein:
the reactive zone comprises at least one of a flame, plasma, furnace, laser heating, or electric heating;
the reactive zone is at a temperature of 500-10000° C. and a pressure of 500 mbar-10 bar; and
transporting the aerosol to the reactive zone for evaporating one or more solvents from the aerosol comprises transporting the aerosol to the reactive zone for evaporating one or more solvents from the aerosol for 0.1-10 seconds.

9. The method according to claim 1, wherein:
transporting the aerosol to the reactive zone comprises transporting the aerosol to the reactive zone without preheating; and
the synthesized particles are hollow-structured.

10. The method according to claim 1, further comprising:
collecting the synthesized particles comprises collecting the synthesized particles from an exhaust stream of the reactive zone by membrane filtering, electrostatic collection, bag filtering, or cold trap.

11. The method according to claim 1,
the synthesized particles comprise a metal oxide, fluoride, sulphide, oxysulphide, silicate, nitrate or nitride; and
the synthesized particles comprise non-aggregated particles.

12. The method according to claim 1, wherein the synthesized particles comprise particles selected from a group consisting of: monodisperse $Li(Ni_{0.33}Mn_{0.33}Co_{0.33})O_2$ particles with an average diameter between 5-100 nm, hollow-structured $Li(Ni_{0.33}Mn_{0.33}Co_{0.33})O_2$ particles, and polydisperse $Li(Ni_{0.33}Mn_{0.33}Co_{0.33})O_2$ particles with diameters between 5 nm-10 µm.

13. A material synthesis method, comprising:
adding a first precursor solution to an atomizer device to generate a first aerosol comprising first liquid droplets;

transporting the first aerosol to a reactive zone for evaporating one or more first solvents from the first aerosol to obtain first synthesized particles of a first size distribution;

adding a second precursor solution to the atomizer device to generate a second aerosol comprising second liquid droplets;

generating, by the atomizer device, the second aerosol with dual size modes comprising a sub-micron droplet mode and a micron droplet mode; and transporting the second aerosol to the reactive zone for evaporating one or more second solvents from the second aerosol to obtain second synthesized particles of a second size distribution.

14. The method according to claim 13, wherein:
the first and second precursor solutions comprise gasoline and water respectively.

15. The method according to claim 13, wherein:
the first and second size distributions are selected from monodisperse and polydisperse distributions;
the monodisperse distribution is associated with an average diameter between 5-100 nm, and is obtained from corresponding liquid droplets that at least 99% by number of which have a diameter of less than 1 μm or an arithmetic mean diameter between 0.1 and 1 μm; and
the polydisperse distribution is associated with diameters between 5 nm-10 μm, and is obtained from corresponding liquid droplets that are sub-micron in diameter or 1-100 μm in diameter.

* * * * *